United States Patent
Takatsu et al.

(10) Patent No.: US 6,963,843 B1
(45) Date of Patent: Nov. 8, 2005

(54) ELECTRONIC COMMERCE SYSTEM AND RECORDING MEDIUM

(75) Inventors: Yuichi Takatsu, Tokyo (JP); Hitoshi Yamazaki, Tokyo (JP)

(73) Assignee: WebMoney Corporation, Tokyo (JP)

( * ) Notice: Subject to any disclaimer, the term of this patent is extended or adjusted under 35 U.S.C. 154(b) by 0 days.

(21) Appl. No.: 09/057,781

(22) Filed: Apr. 9, 1998

(30) Foreign Application Priority Data

Apr. 10, 1997 (JP) .............................................. 9-092348

(51) Int. Cl.⁷ .............................................. G06F 17/60
(52) U.S. Cl. .............................. 705/1; 705/44; 705/26; 235/379; 235/380
(58) Field of Search ................................ 705/1, 26, 65, 705/68, 69, 67, 43, 38, 39, 40; 235/379, 380

(56) References Cited

U.S. PATENT DOCUMENTS

| | | | | |
|---|---|---|---|---|
| 5,453,601 A | * | 9/1995 | Rosen .......................... | 705/65 |
| 5,901,229 A | * | 5/1999 | Fujisaki et al. ............... | 380/30 |
| 5,903,880 A | * | 5/1999 | Biffar .......................... | 235/379 |
| 6,072,870 A | * | 6/2000 | Nguyen et al. ............... | 380/24 |

FOREIGN PATENT DOCUMENTS

JP 403001290 A * 1/1991 ............ G07B/1/00

OTHER PUBLICATIONS

Law, Laurie. "How to Make a Mint: The Cryptography of Anonymous Electronic Cash." Oct. 31, 1996. Retrived online Jun. 3, 2004.*

Tatsuaki Okamaoto, "System for Settling Payment for Purchase by Electronic Cash", Nikkei Electronics, Nikkei BP, Inc., Aug. 19, 1996, the 668th issue, pp. 171–178.

Atsushi Tajima , "NTT and Hitachi Ventring OUt into Electronic Money, whis is almost put into practical use overseas", Nikkei Computer, Nikkei BP, Inc., Feb. 19, 1996, the 385th issue, pp. 109–111.

* cited by examiner

*Primary Examiner*—James P. Trammell
*Assistant Examiner*—James A. Reagan
(74) *Attorney, Agent, or Firm*—Rader, Fishman & Grauer, PLLC

(57) ABSTRACT

An exchange value unit identification code is sent to an electronic note generation site from an electronic note user site. When recognizing presence of an exchange value indicated by the exchange value unit identification code, the electronic note generation site generates an electronic note within a limit which does not exceed the exchange value and an authentication code to the electronic note user site. Then, the electronic note user site sends the authentication code to a transaction site. When a commodity is selected at the electronic note user site after each electronic note has been checked valid, the transaction site sends an acknowledgement of acceptance of the selection to the electronic note user site. After erasure of an electronic note at the electronic note user site is confirmed, an electronic note corresponding to changes is sent to the electronic note user site.

20 Claims, 15 Drawing Sheets

: AUTHENCITATION CODE

ELECTRONIC COMMERCE SYSTEM AND RECORDING MEDIUM

BACKGROUND OF THE INVENTION

1. Field of the Invention

The present invention relates to an electronic commerce system, and, more particularly, to an electronic commerce system which allows electronic representations to bear exchange values.

2. Description of the Related Art

There exist known techniques for allowing electronic information to include a property value and transfers goods through buying and selling or the like via an apparatus which performs input and output operations on the electronic information.

One prior art of such techniques is an electronic monetary system disclosed in U.S. Pat. No. 5,453,601. The contents of this patent are incorporated in this specification by the reference.

In this electronic monetary system, a liability due to overdrawing from an issuing band having an on-line accounting system is generated by the issuing bank in the form of an electronic representation of money.

This electronic representation includes the initial monetary value generated, and at the time of transferring this electronic representation for drawing or the like, a transfer record having the transferred commodity value can be included in the transferred electronic representation.

The "electronic representation" in this prior art represents an overdrawing-originated liability. When the liability is cleared by making a deposit in the overdrawn account, such an electronic representation is supposed to be cleared or invalidated.

To circulate such electronic representations as credited in the same way as promissory notes, information representing the account of the generator is included in such an electronic representation.

With an electronic representation including such information of the generator, the anonymity of the generator is hard to keep unless the generator's account can be opened anonymously. Therefore, it cannot always be said to be appropriate to use such electronic representations in transactions of a type which demands anonymity.

Even in the case where an electronic representation does not represent an overdrawing-originated liability, if generation of the electronic representation involves receipt and disbursement processes on a specific account, information on the contents of the receipt and disbursement processes remains in the electronic representation or a management record in the financial institution. Unless the account is anonymous; a problem similar to that of the case of an electronic representation indicating an overdrawing-originated liability would arise.

As a possible solution to the mentioned problem, one can employ a scheme of circulating prepaid cards each having recorded a personal identification number with which points representing the balance is associated, transmitting the personal identification number to a host computer or the like which manages the points of each personal identification number at the time of purchasing a commodity and reducing points equivalent to the corresponding value of the commodity then.

Transactions of prepaid cards are typically carried out through trading and it is easy to keep the anonymity of each participant in such a transaction. This scheme can easily keep anonymity at the time the personal identification number is transmitted as an electronic representation.

An "electronic representation" in this scheme, unlike the one in the prior art disclosed in the aforementioned U.S. Pat. No. 5,453,601, does not itself represent a monetary value. To find out the balance, for example, it is therefore necessary to access some means, which manages points, for collation with the balance.

It is difficult to logically separate such electronic representations from the means which grasps the current property value of each electronic representation (e.g., the aforementioned host computer that manages points) and circulate them the way money is circulated.

SUMMARY OF THE INVENTION

Accordingly, it is an object of the present invention to provide an electronic commerce system in which electronic representations to be circulated represent property values themselves and which keeps the anonymity of the generator of an electronic representation and old participants who dealt with the electronic notes at the time of generating and transferring the electronic representation.

To achieve the above object, according to the first aspect of this invention, there is provided an electronic commerce system including a network, electronic note generation means connected to the network, contract means connected to the network, and one or more electronic note using means, in which system at least one of the electronic note using means includes electronic note request means for receiving authorization information representing a generation request for an electronic note or an electronic representation of money and presenting the authorization information to the electronic note generation means via the network to request generation of an electronic note of a predetermined amount, the electronic note generation means includes means for accepting presentation of the authorization information and a request for generation of the electronic note from the electronic note using means, determining if the authorization information represents a generation request for the electronic note of an amount equal to or greater than the predetermined amount, and, when determining that such representation is true, generating and supplying the electronic note of the predetermined amount to the electron note using means, at least one of the electronic note using means includes contract applying means for receiving and saving the electronic note of the predetermined amount, presenting the electronic note to the contract means to apply for closing of a contract for supply of a commodity, the contract means includes contract accepting means for detecting presenting of the electronic note and an application for closing of the contract from the electronic note using means and receiving an electronic note which belongs to the presented electronic note and has an amount equivalent to a price of the commodity.

According to this electronic commerce system, an electronic note itself represents a property value. As the electronic note that is generated by the electronic note generation means is made substantially irrelevant to the authorization information and the authorization information is circulated while securing anonymity, a contract for supply of a commodity is made while keeping the anonymity of the generator of the electronic note and old participants who dealt with the electronic note.

In this invention, a "commodity" is a concept including a role.

The electronic commerce system may be designed in such a way that the contract means includes:

means for calculating an excess amount which is a total amount of the electronic note received from the electronic note using means that exceeds the price of the commodity; and means for supplying information indicative of the excess amount and the electronic note of an amount exceeding the excess amount to the electronic note generation means;

the electronic note generation means includes means for invalidating the electronic note of an amount exceeding the excess amount, generating a first electronic note of an amount substantially equal to the excess amount and a second electronic note of an amount substantially equal to a difference between the amount of the invalidated electronic note and the excess amount, and supplying the first electronic note and the second electronic note to the contract means; and the contract means further includes means for receiving the first and second electronic notes and supplying the second electronic note to the electronic note using means.

With this structure, the corresponding value of a commodity is received without overpayment or underpayment, and the balance is returned to, for example, a user.

The electronic commerce system may be designed in such a way that the contract means includes:

means for calculating an excess amount which is a total amount of the electronic note received from the electronic note using means that exceeds the price of the commodity; and means for determining if the contract means has itself already retained the electronic note whose total amount is equivalent to the excess amount, and, when determining that such an electronic note is held, supplying the second electronic note whose total is equivalent to the excess amount to the electronic note using means.

With this structure, the contract means ensures settlement without overpayment or underpayment and without requiring additional means for separating an electronic note.

The electronic note using means may have means for supplying the electronic note together with separation information representing a plurality of amounts whose total is substantially equal to the amount of the electronic note, to the electronic note generation means; and at least one of the electronic note generation means and the contract means may have means for invalidating the electronic note supplied together with the separation information, and generating and supplying a plurality of electronic notes having amounts indicated by the separation information to the electronic note using means. This structure allows exchange of electronic notes.

For authorization information to represent the correct balance, for example, the electronic note generation means determines if the authorization information received from the electronic note using means represents a generation request for the electronic note whose amount exceeds the predetermined amount, and, after determining that the amount of the electronic note is greater than the predetermined amount, handles the authorization information as representing a generation request for an electronic note of an amount which is the predetermined amount subtracted from an amount represented before determination.

If commodities are directly providable like software, the contract means may include means for supplying the commodity to the electronic note using means.

At least one of the electronic note using means, the contract means and the electronic note generation means may have means for appending additional information to the electronic note; and at least one of the electronic note using means, the contract means and the electronic note generation means may have means for acquiring the additional information appended to the electronic note.

In this case, the contract means may include means for acquiring the additional information appended to the electronic note and determining whether or not to receive the electronic note based on the additional information.

Specifically, the electronic note generation means may include means for appending date information indicating a date on which the electronic note has been generated, to the electronic note;

the electronic note using means may include means for appending date information indicating a date on which the electronic note has been transferred, to the electronic note; and the contract means may include means for determining whether or not to receive the electronic note based on the date information appended to the electronic note.

The electronic note using means may include means for appending corroboration information indicating the electronic note having been transferred, to the electronic note; and the contract means may include means for determining whether or not to receive the electronic note based on the corroboration information appended to the electronic note.

The corroboration information may include transferor information for specifying a transferor of the electronic note and transferee information for specifying a transferee of the electronic note, the transferor information including signature information corroborating that the transferor information has been prepared by the transferor. This structure can guarantee that corroboration information is genuinely added by a transferor's manipulation or the like.

At least one of the electronic note using means may have transfer means for transferring the electronic note it stores itself to a recording medium readable by a computer; and at least one of the electronic note using means may have transferee means for acquiring the electronic note transferred to the recording medium.

This structure permits electronic notes to be transferred via an external recording medium provided outside this electronic commerce system.

In this case, the electronic commerce system may be designed in such a way that each of the electronic note using means has means for encrypting the electronic note with an encryption key specific to each electronic note using means;

the electronic note using means having the transfer means has means for supplying first transfer data indicative of the electronic note to be transferred to the recording medium, to the electronic note generation means;

the electronic note using means having the transferee means has means for supplying second transfer data indicative of the electronic note acquired from the recording medium, to the electronic note generation means; and the electronic note generation means has means for determining if the first and second transfer data represent substantially the same electronic note, and, when determining that such representation is true, generating and supply an electronic note of an amount substantially equal to the amount of the electronic note indicated by the second transfer data, to the electronic note using means to which the second transfer data has been supplied.

This structure prevent unauthorized copying of an electronic note recorded on a recording medium.

The electronic note generation means may include means for transferring generation request form data representing a form to fill in predetermined items including the authorization information and the predetermined amount, to the electronic note using means; and the electronic note request means may include:

means for displaying the form represented by the generation request form data on a display screen;

means for acquiring the authorization information and filling in the predetermined items in the form displayed on the display screen; and means for transmitting the predetermined items filled in the form to the electronic note generation means to thereby request generation of the electronic note.

Alternatively, the contract means may include means for transferring application form data representing an application form to fill in application items including the electronic note, to the electronic note using means; and the contract applying means may include:

means for displaying the application form represented by the application form data on a display screen;

means for acquiring the electronic note and filling in the application items in the application form displayed on the display screen; and means for transmitting the application items filled in the application form, to the electronic note generation means to thereby apply closing of a contract for supply of a commodity.

This structure allows an electronic commerce system to be suitably constituted by using a network system which comprises a web server and clients, like the Internet or an intranet.

In the case where this electronic commerce system is constituted by using, a network system or the like which comprises a web server and clients, this electronic commerce system should further comprise a server connected to the electronic note request means; and wherein a specific resource locator should be affixed to the generation request form data;

the electronic note request means should have means for transmitting the resource locator to the server; and the server should have means for acquiring the generation request form data affixed with the resource locator, received from the electronic note request means, from the electronic note generation means and transmitting the generation request form data to the electronic note request means.

Alternatively, the electronic commerce system should further comprise a server connected to the contract applying means; and wherein a specific resource locator should be affixed to the application form data;

the contract applying means should have means for transmitting the resource locator to the server; and the server should have means for acquiring the application form data affixed with the resource locator, received from the contract applying means, from the contract means and transmitting the application form data to the contract applying means.

The server may have at least one of the electronic note generation means and the contract means.

The electronic commerce system may be designed in such a way that the contract means includes means for informing the electronic note generation means of information indicating the electronic note presented by the electronic note using means; and the electronic note generation means includes:

means for storing a list of information showing the generated electronic note; and means for determining if the list contains the information indicating of the electronic note informed by the contract means and informing the contract means of a determination result.

This structure allows the electronic note generation means to check if an electronic note is genuine, and thus enhances transaction safety.

According to the second aspect of this invention, there is provided an electronic commerce system comprising an electronic note generation section, a commodity providing section and an electronic note storage section connected to one another, in which system the electronic note storage section sends an identification code requesting generation of an electronic note comprised of information representing an amount equal to or smaller than a predetermined credit limit, to the electronic note generation section to request the electronic note generation section to generate the electronic note representing the amount, the electronic note generation section determines whether or not to generate the electronic note representing the amount based on the identification code received, and generates and supplies the electronic note representing the amount to the electronic note storage section when determining to generate the electronic note, the electronic note storage section further receives and saves the electronic note representing the amount, reporting an application for supply of a commodity to the commodity providing section and sends information on the saved electronic note to the commodity providing section, the commodity providing section determines whether or not to accept the application based on the reported application and an amount represented by the electronic note, and, when determining to accept the application, sends an acknowledgement of acceptance to the electronic note storage section and receives the electronic note representing an amount equivalent to a corresponding value of the commodity from the electronic note storage section.

According to this electronic commerce system, an electronic note itself represents a property value. As the electronic note that is generated by the electronic note generation means is made substantially irrelevant to the identification code and the identification code is circulated while securing anonymity, a contract for supply of a commodity is made while keeping the anonymity of the generator of the electronic note and old participants who dealt with the electronic note.

According to the third aspect of this invention, there is provided an electronic commerce system comprising an information generation section, a commodity providing section, an information storage section and a network connected to one another, in which system the information storage section sends an identification code requesting generation of an electronic note comprised of information representing an amount equal to or smaller than a predetermined credit limit, and an application for supply of a commodity to the commodity providing section, the commodity providing section receives the application and the identification code and sends the received identification code to the information generation section to request the information generation section to generate the information representing an amount equivalent to a corresponding value of the commodity, the information generation section determines whether or not to generate the information representing the amount equivalent to the corresponding value based on the received identification code, and generates and supplies the information representing the amount equivalent to the corresponding value to the commodity providing section when determining to generate the electronic note, the commodity providing section receives the information representing the amount equivalent to the corresponding value, determines whether or not to accept the application based on the received application and the information representing the amount equivalent to the corresponding value, and, when determining to accept the application, sends an acknowledgement of acceptance to the information storage section.

According to this electronic commerce system, as the information that is generated by the information generation section is made substantially irrelevant to the identification code and the identification code is circulated with anonymity maintained, a participant who knows the identification code closes a contract for supply of a commodity whose price lies under the predetermined amount. At this time, it is possible to keep the anonymity of the participant who knows the identification code.

For the identification code to represent the correct balance, for example, the information generation section may have means for storing an amount obtained by subtracting the amount equivalent to the corresponding value from the credit limit indicated by the identification code as a new credit limit, when determining to generate the information representing the amount equivalent to the corresponding value.

According to the fourth aspect of this invention, there is provided an electronic commerce system comprising an electronic note generation section, a plurality of an electronic note exchange sections and a network, the former two connected to one another via the network, in which system each of the electronic note exchange sections sends an identification code requesting generation of an electronic note comprised of information representing a predetermined amount, to the electronic note generation section to request the electronic note generation section to generate the electronic note representing the amount, the electronic note generation section determines whether or not to generate the electronic note representing the amount based on the identification code received, and generates and supplies the electronic note representing the amount to the electronic note storage section that has sent the identification code, when determining to generate the electronic note, each of the electronic note exchange sections further receives and saves the electronic note representing the amount from the electronic note generation section, sends information on the saved electronic note to the other electronic note exchange sections, receives information indicative of the electronic note from the other electronic note exchange sections, determines whether or not to accept the electronic note based on the received information indicative of the electronic note, and, when determining to receive the electronic note, receives the electronic note.

According to this electronic commerce system, an electronic note itself represents a property value. As the electronic note that is generated by the electronic note generation means is made substantially irrelevant to the identification code and the identification code is circulated while securing anonymity, the electronic note is exchanged while keeping the anonymity of the generator of the electronic note and old participants who dealt with the electronic note.

According to the fifth aspect of this invention, there is provided a recording medium having stored a program for allowing a computer, connected via a network to electronic note request means for presenting authorization information representing a generation request for an electronic note or an electronic representation of money to request generation of an electronic note of a predetermined amount, to function as electronic note generation means for accepting presentation of the authorization information and a request for generation of the electronic note, determining if the presented authorization information represents a generation request for an electronic note of an amount equal to or greater than the predetermined amount, and, when determining such representation is true, generating and supplying the electronic note of the predetermined amount to the sender of the authorization information.

The computer which runs a program stored in this recording medium makes an electronic note representing a property value substantially irrelevant to the authorization information, so that the anonymity of the generator of the electronic note is maintained by circulating the authorization information with anonymity held.

According to the sixth aspect of this invention, there is provided a recording medium having stored a program for allowing a computer, connected via a network to contract applying means for presenting an electronic note or an electronic representation of money to apply for closing of a contract, to function as contract accepting means for detecting presentation of the electronic note and an application for closing of the contract from the contract applying means, and receiving an electronic note which belongs to the presented electronic note and has an amount equivalent to a price of the commodity.

The computer which runs a program stored in this recording medium receives an electronic note representing a property value and closes a contract for supply of a commodity. By circulating the electronic note with anonymity kept, a contract for supply of the commodity is made while keeping the anonymity of old participants who dealt with the electronic note.

According to the seventh aspect of this invention, there is provided a recording medium having stored a program for allowing a computer, connected via a network to electronic note generation means for accepting presentation of authorization information representing a generation request for an electronic note or an electronic representation of money and a request for generation of the electronic note, determining if the authorization information represents a generation request for an electronic note of an amount equal to or greater than a predetermined amount, and, when determining such representation is true, generating and supplying the electronic note of the predetermined amount to electronic note using means, and contract accepting means for detecting presentation of the electronic note and an application for closing of a contract and receiving an electronic note which belongs to the presented electronic note and has an amount equivalent to a price of the commodity, to function as electronic note request means for receiving the authorization information and presenting the authorization information to the electronic note generation means to request generation of the electronic note of the predetermined amount, and contract applying means for receiving and saving the electronic note from the electronic note generation means and presenting the electronic note to the contract accepting means to apply for the contract.

This electronic commerce system acquires an electronic note which represents a property value and is generated as substantially irrelevant to the authorization information, and asks the contract accepting means for supply of a commodity by using the electronic rote that is generated from the electronic note generation means. By circulating the authorization information with anonymity maintained, therefore, a commercial transaction using an electronic note is made while keeping the anonymity of the generator of the electronic note and old participants who dealt with the electronic note.

DETAILED DESCRIPTION OF THE PREFERRED EMBODIMENTS

An electronic commerce system embodying this invention will now be described.

Figure 1:
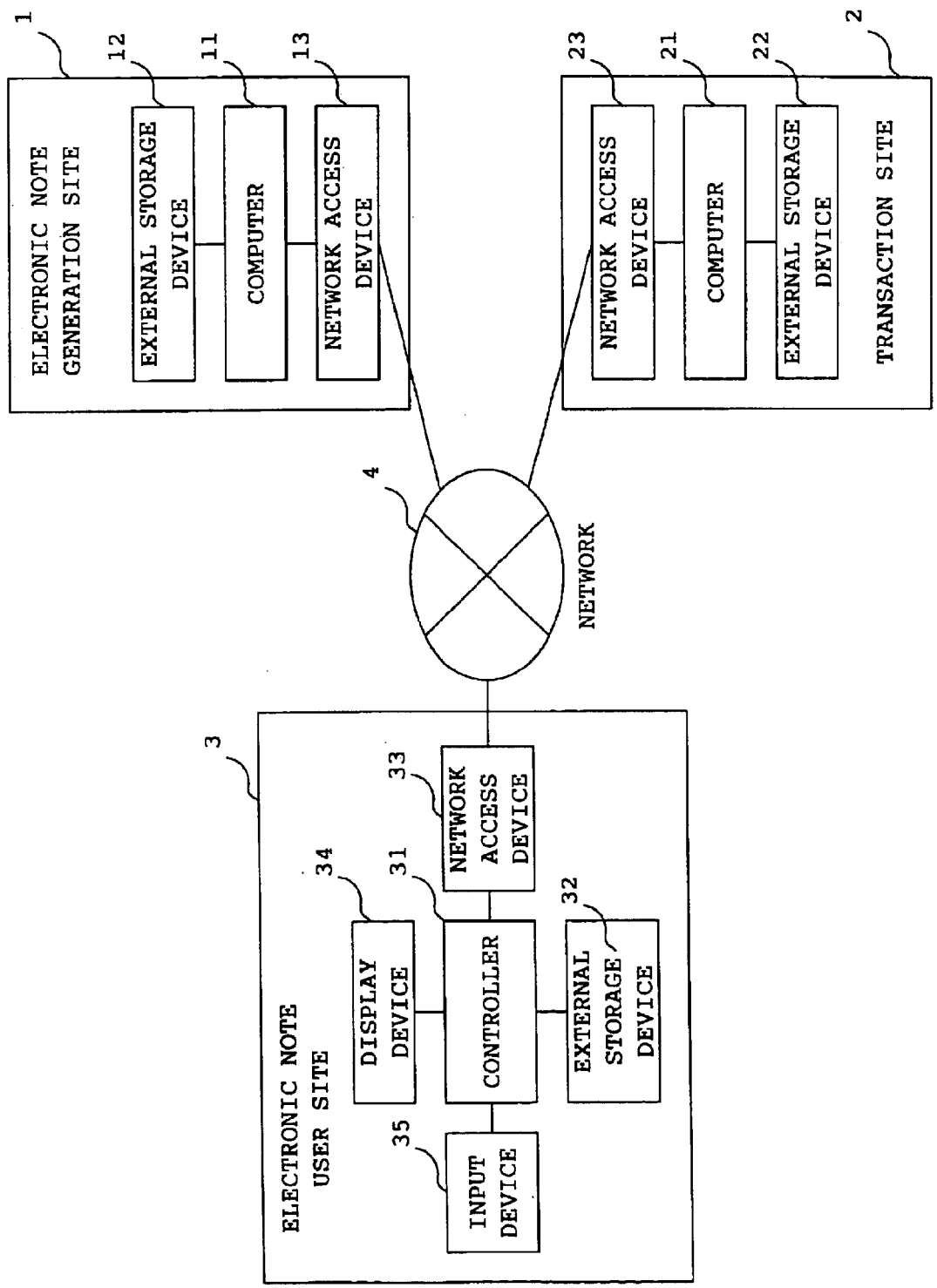
FIG. 1 is a block diagram illustrating the fundamental structure of an electronic commerce system according to one embodiment of this invention.

FIG. 1 exemplifies the structure of the electronic commerce system according to one embodiment of this invention.

As illustrated, this electronic commerce system comprises an electronic note generation site 1, a transaction site 2, an electronic note user site 3 and a network 4.

The network 4 is the Internet or the like which intermediates among the electronic note generation site 1, the transaction site 2 and the electronic note user site 3.

The electronic note generation site 1 includes a computer 11, an external storage device 12, a network access device 13. The electronic note generation site 1 is given a specific address for the network 4 to specify the site 1. When the network 4 is the Internet, the address is a URL (Uniform Resource Locator), for example.

The computer 11 is connected to the network 4 via the network access device 13 which is comprised of a terminal adapter or the like. The computer 11 receives an exchange value unit identification code 71 (which will be discussed later) from the electronic note user site 3 that is connected to the computer 11 over the network 4, and runs an electronic note generation program 52 to be discussed later.

The external storage device 12, which comprises a hard disk drive or the like, carries out processes, such as data storage, erasure and output of the stored contents, under the control of the computer 11.

The transaction site 2, connected to the network 4, comprises a computer 21, an external storage device 22 and a network access device 23. A specific address is also given to the transaction site 2.

The computer 21 is connected to the network 4 via the network access device 23 which is comprised of a terminal adapter or the like. The computer 21 receives an authentication code 73 (which will be discussed later) from the electronic note user site 3 that is connected to the computer 21 over the network 4, and runs a transaction program 53 to be discussed later.

The external storage device 22, which comprises a hard disk drive or the like, performs processes, such as data storage, erasure and output of the stored contents, under the control of the computer 21.

The electronic note user site 3 comprises a controller 31, an external storage device 32, a network access device 33, a display device 34 and an input device 35. The electronic note user site 3 is likewise given a specific address.

The controller 31, comprising a central processing unit (CPU), etc., is connected to the network 4 via the network access device 33 which is comprised of a modem or the like. The controller 31 runs an electronic note request program 54, a transaction request program 55, network link programs 51*a* to 51*c* and decoding programs 56*a* to 56*c*, all of which will be discussed later.

The external storage device 32, which comprises a hard disk drive or the like, carries out processes, such as data storage, erasure and output of the stored contents, under the control of the controller 31.

The input device 35 comprises a keyboard, a mouse and the like. The input device 35 is used to permit an operator to make inputs and sends a signal representing the input information to the controller 31.

Figure 2:
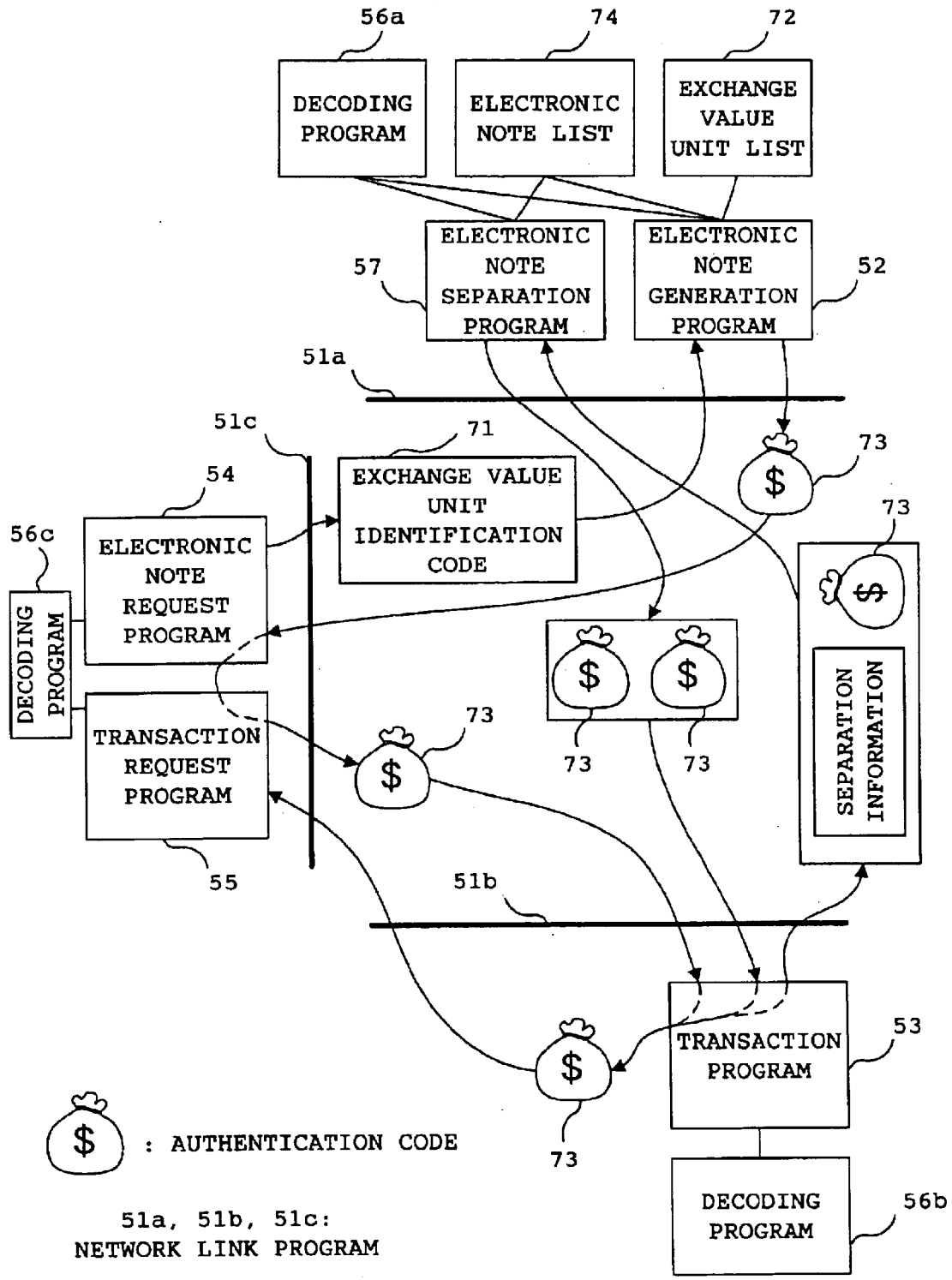
FIG. 2 is a block diagram showing the logical structure of the electronic commerce system embodying this invention.

As shown in FIG. 2, from the logical point of view, this electronic commerce system comprises the electronic note generation program 52, the transaction program 53, the network link programs 51a–51c, the electronic note request program 54, the transaction request program 55, the decoding programs 56a–56c, the exchange value unit identification code 71, an exchange value unit list 72, the authentication code 73, and an electronic note list 74.

The network link programs 51a–51c are respectively stored in the external storage devices 12, 22 and 32 of the electronic note generation site 1, the transaction site 2 and the electronic note user site 3, and are read out and run by the computers 11 and 21 and the controller 31.

The network link programs 51a–51c respectively control the network access devices 13, 23 and 33 to connect the computers 11 and 21 and the controller 31 to one another over the network 4.

The electronic note request program 54, stored in the external storage device 32 of the electronic note user site 3, is read and run by the controller 31.

The electronic note request program 54 requests the electronic note generation site 1, connected thereto by the network link programs 51a–51c, to generate an electronic note. The electronic note request program 54 stores the received authentication code 73 into the external storage device 32.

The transaction request program 55, stored in the external storage device 32 of the electronic note user site 3, is read and run by the controller 31.

The transaction request program 55 request the transaction site 2 for a transaction for receiving of a commodity, and sends the authentication code 73 there. Then, the transaction request program 55 acquires information indicating the results of the transaction request from the transaction site 2 and stores it in the external storage device 32.

The decoding programs 56a–56c are designed to extract information of the amount of an electronic note from the authentication code 73.

The decoding programs 56a–56c, respectively stored in the external storage devices 12, 22 and 32, are read and run by the computers 11 and 21 and the controller 31.

The electronic note generation program 52 determines whether or not to issue the authentication code 73 based on the exchange value unit identification code 71 input to the computer 11 from the controller 31 of the electronic note user site 3. When issuance is determined, the electronic note generation program 52 determines the amount of an electronic note to be generated and prepares the authentication code 73 which represents an electronic note of that amount. Then, the electronic note generation program 52 sends the produced authentication code 73 over the network 4 to the electronic note user site 3.

The transaction program 53, stored in the external storage device 22 of the transaction site 2, is read and run by the computer 21.

The transaction program 53 determines whether or not to provide a commodity based on the authentication code 73 supplied to the computer 21 from the controller 31 of the electronic note user site 3. When a commodity should be provided, the transaction program 53 informs the electronic note user site 3 of the provision of the commodity.

When the amount of the supplied electronic note exceeds the price of the commodity, the transaction program 53 sends the authentication code 73 of the electronic note to be separated and information specifying the amount of each electronic note prepared as a result of the separation, to the electronic note generation site 1 in order to request the electronic note generation site 1 to produce an electronic note of the excess amount. Then, the transaction program 53 receives each electronic note prepared as a result of the separation from the electronic note generation site 1, and sends the authentication code 73 representing the electronic note equivalent to the excess amount that should be returned to the user, to the electronic note user site 3 over the network 4.

The electronic note separation program 57, stored in the external storage device 12 of the electronic note generation site 1, is read and run by the computer 11.

Upon reception of the request for separation of an electronic note from the computer 21, the electronic note separation program 57 separates the electronic note, indicated by the authentication code 73 sent from the computer 21, by a separation scheme which is specified by the host computer. The authentication code 73 which indicates the resultant separated electronic note is sent over the network 4 to the transaction site 2.

Each of the electronic note generation program 52, the electronic note request program 54, the transaction program 53 and the transaction request program 55 terminates its process when termination of the process is externally instructed, regardless of the subsequent processing.

The exchange value unit identification code 71 functions as an evidence of authorization to the electronic note generation site 1 to generate an electronic note, and is previously generated by a manager or the like at the electronic note generation site 1. This identification code 71 is recorded in the form directly unviewable by a person; for example, it may be printed on paper and then light-shielded. This identification code 71 is to be transferred together with the medium carrying this code.

There is an upper limit to the amount of an electronic note whose generation can be requested. Hereinafter, the upper limit of the amount of an electronic note whose generation can be requested per each authorization is called "exchange value unit."

The exchange value unit list 72 is information which represents the initial balance of the exchange value unit of the authorization, indicated by each exchange value unit identification code 71, and the current balance, and is stored in the external storage device 12 of the electronic note generation site 1.

The exchange value unit list 72 consists of a plurality of records each of which contains the exchange value unit identification code 71, information about the initial balance of the exchange value unit of the authorization indicated by that identification code 71, and information about the current balance.

The authentication code 73 represents an electronic note itself, and is generated by the electronic note generation program 52 as mentioned above.

The authentication code 73 consists of encoded information on what results from combining information specifying an electronic note and information representing the amount of an electronic note by using a predetermined scheme. Further, the authentication codes 73 differ from one another.

The electronic note list 74, which includes information of an electronic note which is currently circulated, is stored in the external storage device 2 of the electronic note generation site 1 and is used to discriminate whether or not an electronic note is valid.

The electronic note list 74 consists of a plurality of records each of which contains the authentication code 73 representing the circulated valid electronic note and information on the amount of that electronic note.

The operation of this electronic commerce system will now be explained with reference to FIGS. 3 through 7.

Figure 3:
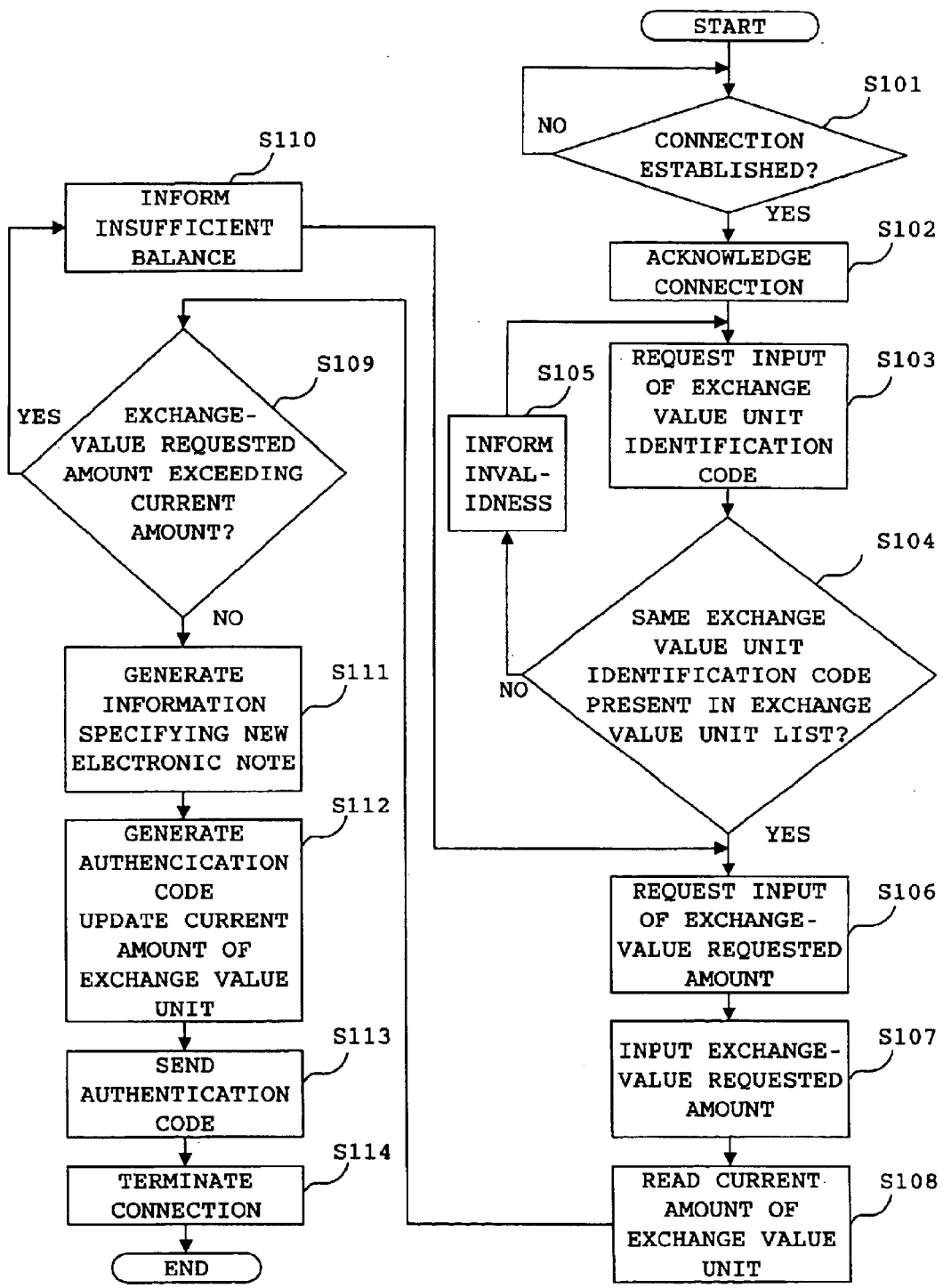
FIG. 3 is a flowchart illustrating a process of an electronic note generation program.
Figure 4:
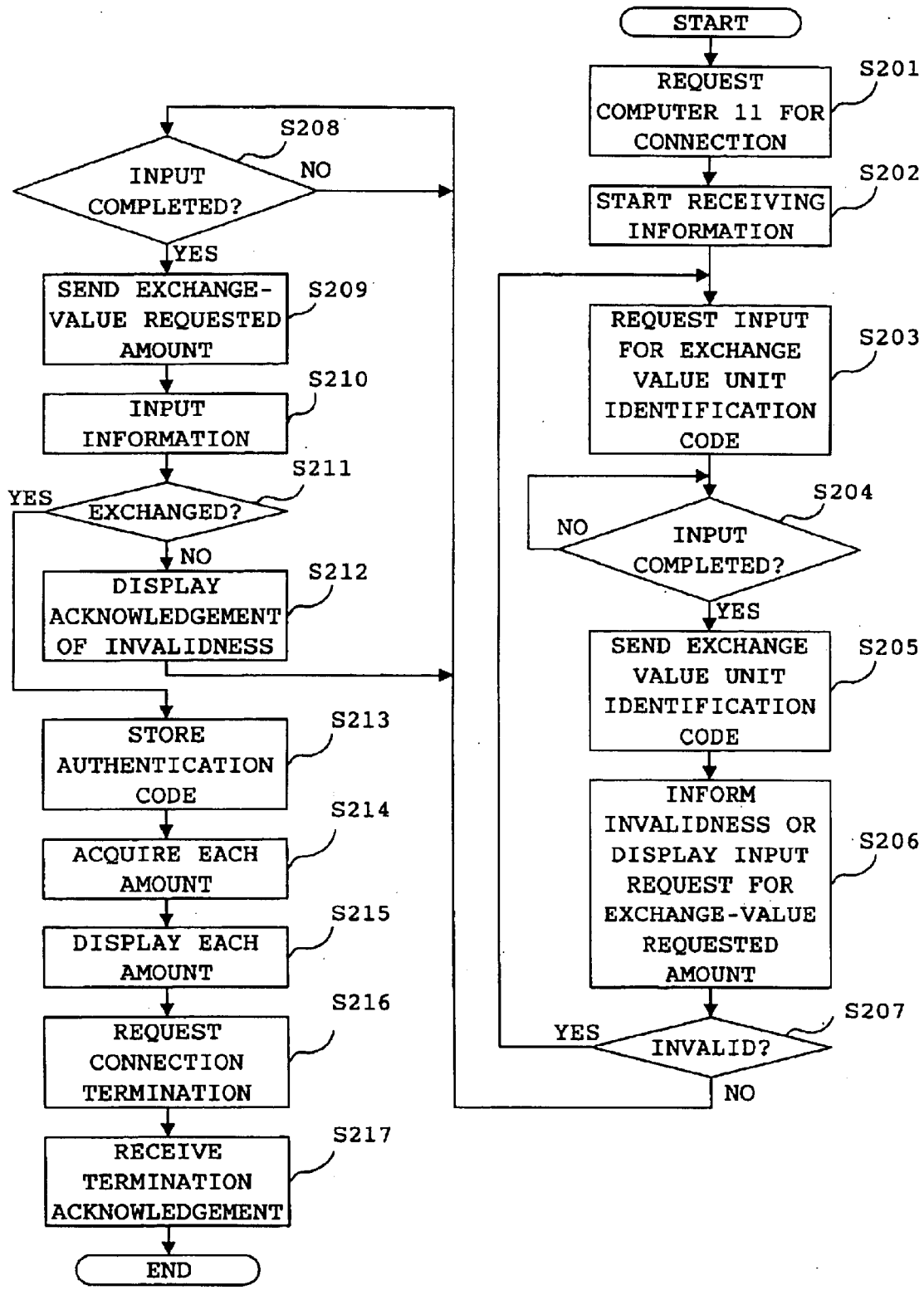
FIG. 4 is a flowchart illustrating a process of an electronic note request program.
Figure 5:
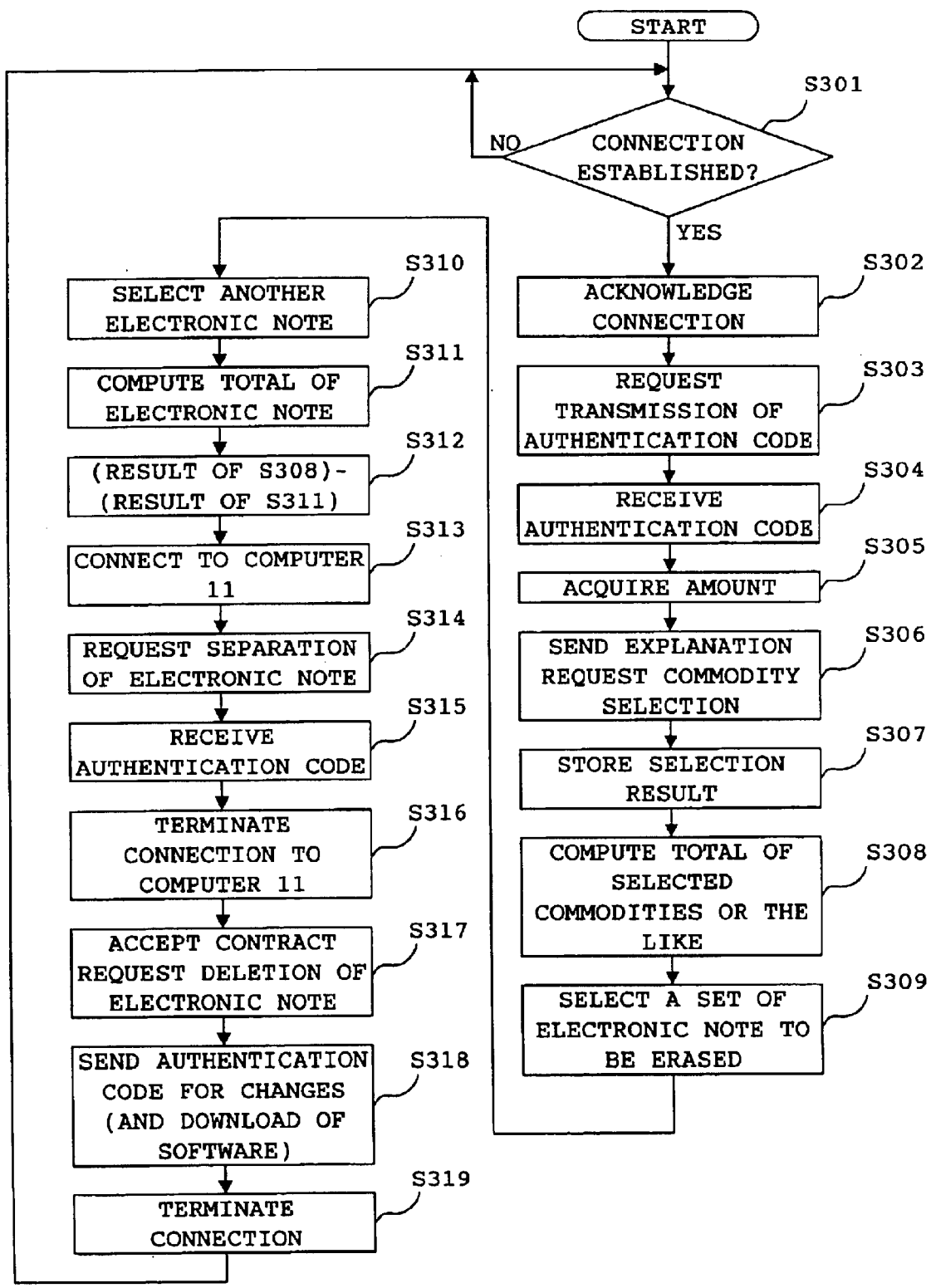
FIG. 5 is a flowchart illustrating a process of a transaction program.
Figure 6:
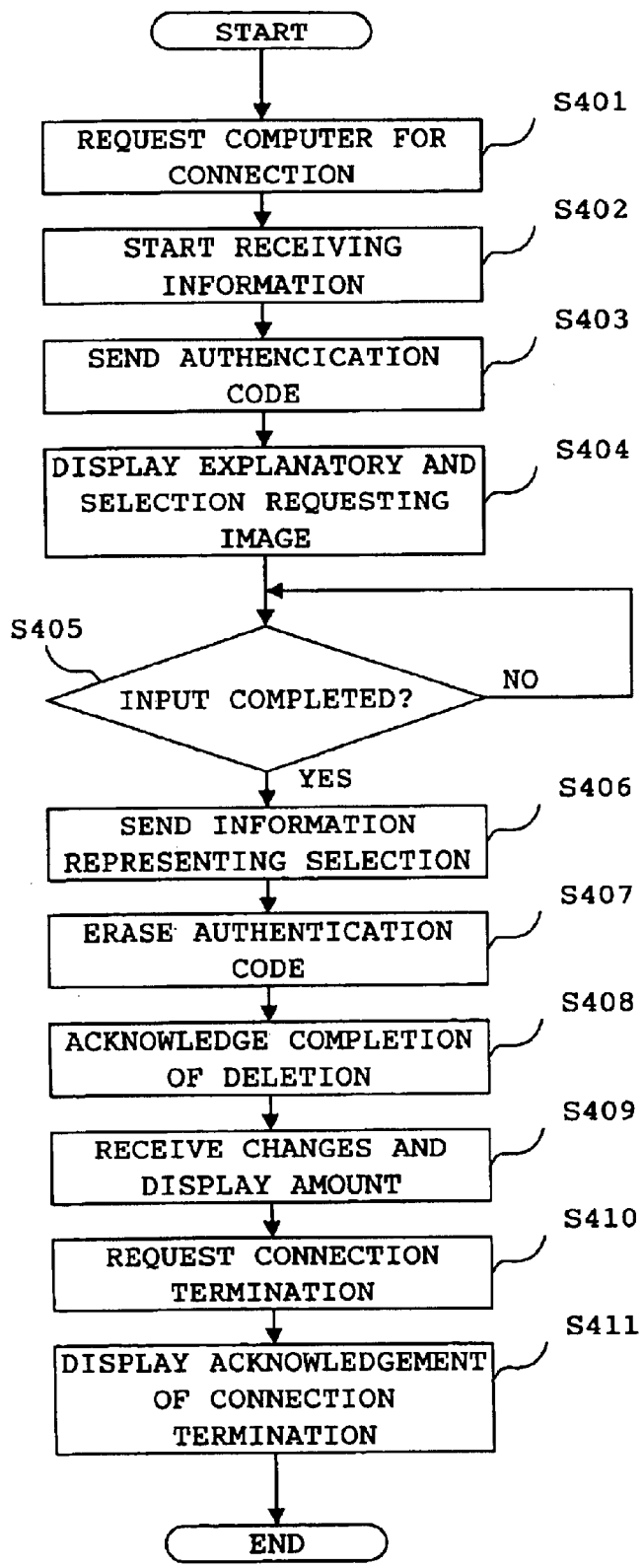
FIG. 6 is a flowchart illustrating a process of a transaction request program.
Figure 7:
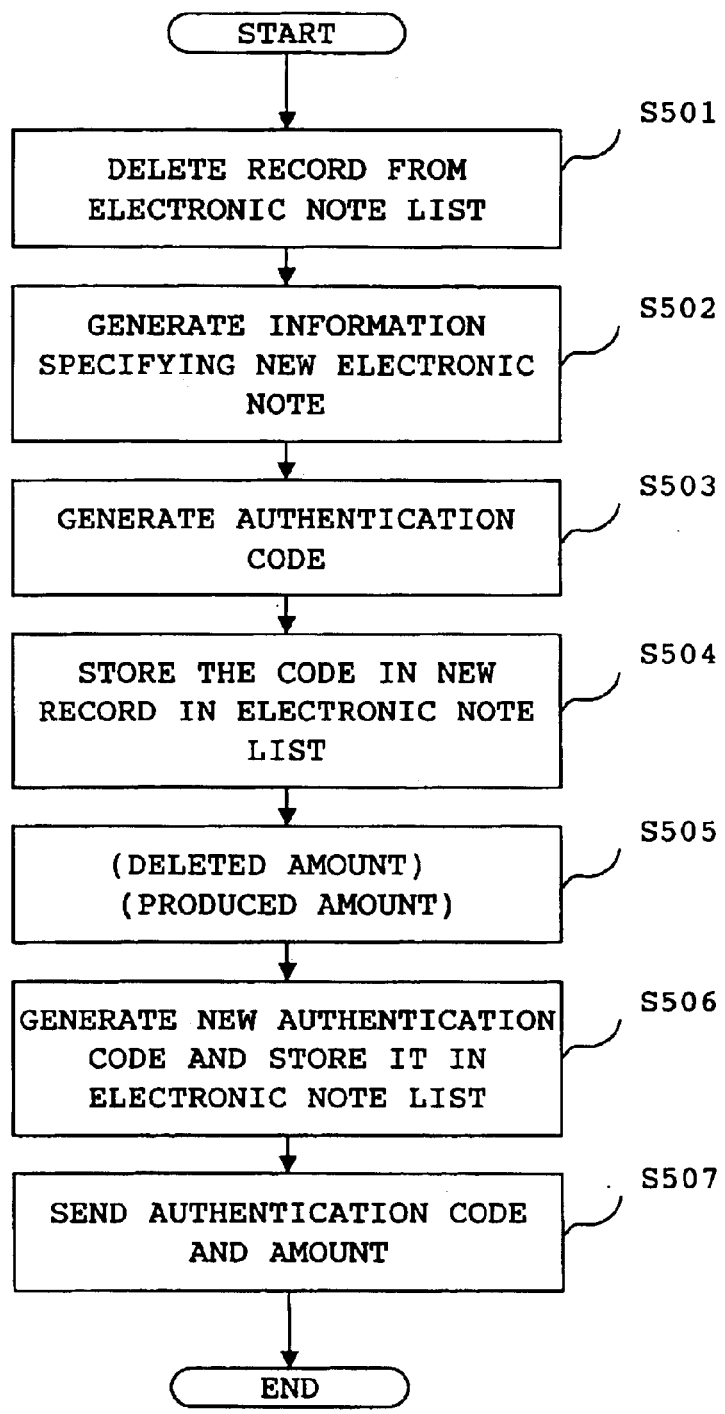
FIG. 7 is a flowchart illustrating a process of an electronic note separation program.

FIG. 3 is a flowchart illustrating the process of the electronic note generation program 52, FIG. 4 is a flowchart showing the process of the electronic note request program 54, FIG. 5 is a flowchart depicting the process of the transaction program 53, FIG. 6 is a flowchart showing the process of the transaction request program 55, and FIG. 7 is a flowchart illustrating the process of the electronic note separation program.

Process to Generate Electronic Money

The following will discuss a process for the electronic note generation site 1 to generate a new electronic note and a process for the electronic note user site 3 to receive the electronic note.

When activated, the computer 11 at the electronic note generation site 1 invokes the network link program 51a to connect itself to the network 4. Then, the computer 11 invokes the electronic note generation program 52 shown in FIG. 3.

When the electronic note generation program 52 is activated, the computer 11 determines if connection to another site has been established (S101).

When it is determined that such connection is not established, the computer 11 repeats the process of step S101. When establishment of the connection is determined, the computer 11 proceeds to step S102 which will be discussed shortly.

When the controller 31 at the electronic note user site 3 externally receives an instruction for connection to the network 4, the controller 31 invokes the network link program 51c to connect itself to the network 4, then invokes the electronic note request program 54. Then, the controller 31 initiates the process illustrated in FIG. 4.

When the controller 31 starts the process in FIG. 4, the controller 31 generates a connection request to the computer 11 of the electronic note generation site 1 in accordance with the process of the network link program 51c (S201).

The computer 11 which has received the connection request establishes connection to the controller 31 and sends a signal acknowledging the connection to the controller 31 in step S102.

Next, the computer 11 sends information which represents an image requesting the input of the exchange value unit identification code 71 to the controller 31 (S103).

After having issued the connection request and when receiving the connection acknowledging signal, the controller 31 starts receiving information sent from the electronic note generation site 1 (S202). Upon reception of the information which represents an image requesting the input of the exchange value unit identification code 71, the controller 31 displays the image on the display device 34 (S203).

When the image requesting the input of the exchange value unit identification code 71 is displayed, the controller 31 accepts the input of the exchange value unit identification code 71 which is made through the input device 35, and determines if the input has been completed (S204).

When determining that the input has not been completed, the controller 31 repeats the process of step S204. When determining that the input has been completed, the controller 31 sends the input exchange value unit identification code 71 to the computer 11 (S205).

The computer 11 which has received the exchange value unit identification code 71 searches the exchange value unit list with this identification code 71 as a key to determine whether or not there is a record which includes the same code as the identification code 71 (S104).

When it is determined that there is no corresponding record, the computer 11 sends the controller 31 information representing an image to report that the exchange value unit identification code 71 is an invalid code (S105), and returns to step S103.

When it is determined that a corresponding record exists, the computer 11 sends the controller 31 information representing an image requesting the input of the amount of an electronic note whose generation is requested (S106), then goes for the process starting at step S107, which will be discussed later.

When outputting the exchange value unit identification code 71, the controller 31 receives information showing the result of authentication of the exchange value unit identification code 71, i.e., the information that has been sent to the controller 31 from the computer 11 in step S105 or S106, and displays the image represented by that information on the display device 34 (S206).

Next, the controller 31 determines if the exchange value unit identification code 71 that was input in step S204 has been determined as invalid, from the information input in step S206 (S207).

When the exchange value unit identification code 71 has been determined as invalid, the controller 31 goes to step S203. When the exchange value unit identification code 71 has been determined as valid, on the other hand, the controller 31 accepts the input of the amount of an electronic note whose generation the user desires, and determines if the input has been completed (S208).

When determining that the input has not been completed, the controller 31 repeats the process of step S208. When determining that the input has been completed, the controller 31 sends information representing the amount of electronic note requested to the computer 11 (S209).

In step S107, the computer receives the information indicating the amount of an electronic note whose generation the user requested. Then, from the record sought out in step S104, the controller 31 reads the current balance of the exchange value unit indicated by this record (S108).

Next, based on the amount input in step S107 and the balance of the current exchange value unit read in step S108, the computer 11 determines if the amount of an electronic note whose generation the user requested exceeds the balance of the current exchange value unit (S109).

When determining that the former amount exceeds the latter balance, the computer 11 sends information representing an image which informs an insufficient balance and request reinput of an amount to the controller 31 (S110), and returns to step S106.

When determining that no exceeding occurs, the computer 11 generates information which specifies a new electronic note and information representing an amount equal to the amount input by the user (S111). Then, both information are combined by a predetermined scheme and the resultant information is then encoded by a predetermined scheme, thus yielding an authentication code 73. Further, the balance of the exchange value unit recorded in the record that has been sought out in step S104 is updated to the user input amount deducted from this balance (S112).

Then, a new record is put in the electronic note list 74, the generated authentication code 73 and the information of the amount of an electronic note generated are stored in that record, and then the generated authentication code 73 is sent to the controller 31 (S113).

After sending the information representing the amount of an electronic note whose generation is requested by the user to the computer 11, the controller 31 acquires the information sent to itself from the computer 11 (S210) and determines if generation of an electronic note has been conducted (S211).

When determining that generation of an electronic note has not been carried out, the controller 31 displays the image represented by the information sent from the computer 11 in step S110 (i.e., the image request reinput of the amount of an electronic note) on the display device 34 (S212) and returns to step S208.

When determining that generation of an electronic note has been carried out, the controller 31 writes the authentication code 73, sent from the computer 11 in step S113, into the external storage device 32 (S213).

Then, the controller 31 runs the decoding program 56c to acquire the amount of each electronic note indicated by the authentication code 73 stored in the external storage device 32 (S214).

Then, the controller 31 displays the acquired amount of each electronic note on the display device 34 (S215), and request the computer 11 for disconnection from the electronic note generation site 1 (S216).

The computer 11 which has received the disconnection request sends a signal acknowledging disconnection to the controller 31 (S114), and returns to S101.

Upon reception of the disconnection acknowledgment (S217), the controller 31 terminates the electronic note request program 54.

Through the above-described processing, the exchange value unit identification code 71 is sent to the electronic note generation site 1 from the electronic note user-site 3, and when the presence of the exchange value unit of the authorization indicated by this identification code 71 is confirmed, the electronic note user site 3 can request generation of an electronic note which does not exceeds the balance of the exchange value unit.

Then, the electronic note generation site 1 generates the electronic note whose amount does not exceeds the balance of the exchange value unit, and produces and sends the authentication code 73 indicating that electronic note to the electronic note user site 3, which in turn receives and stores the authentication code 73.

Process to Utilize Electronic Money

A description will now be given of a process of allowing the user to use the acquired electronic note.

When activated, the computer 21 at the transaction site 2 invokes the network link program 51b to connect itself to the network 4. Then, the computer 21 invokes the transaction program 53 shown in FIG. 5.

When the transaction program 53 is activated, the computer 21 determines if connection to another site has been established (S301).

When it is determined that such connection is not established, the computer 21 repeats the process of step S301. When establishment of the connection is determined, the computer 21 goes for the process starting at step S302 which will be discussed shortly.

When the controller 31 at the electronic note user site 3 externally receives an instruction for connection to the network 4, the controller 31 invokes the network link program 51c to connect itself to the network 4, then invokes the transaction request program 55. Then, the controller 31 executes the process illustrated in FIG. 6.

When the controller 31 starts the process in FIG. 6, the controller 31 generates a connection request to the computer 21 of the transaction site 2 in accordance with the process of the network link program 51c (S401).

The computer 21 which has received the connection request establishes connection to the requester and sends a signal acknowledging the connection to the requester in step S302.

Next, the computer 21 requests the controller 31 to sent the authentication code 73 which is currently stored in the external storage device 32 (S303).

After having made the connection request and when receiving the connection acknowledging signal, the controller 31 starts receiving information sent from the transaction site 2 (S402).

Upon reception of the request for the transmission of the authentication code 73 from the computer 21, the controller 31 reads the authentication code 73 currently stored in the external storage device 32 and sends it to the computer 21 (S403).

Upon reception of the authentication code 73 (S304), the computer 21 invokes the decoding program 56b and acquires the amount of an electronic note, indicated by each received authentication code 73, in accordance with the process of the decoding program 56b (S305).

Then, the computer 21 sends the controller 31 information on the total of the amount acquired in step S305, information on an image which explains commodities which can be purchased within the total amount, and information on an image requesting selection of a commodity to be purchased (S306).

Upon reception of those three information, the controller 31 displays the amount of each electronic note on the display device 34 as well as the image explaining the individual commodities and the image requesting selection of a commodity (S404).

The controller 31 accepts the input of information on selection of any commodity, which is made through the input device 35, and determines if the input has been completed (S405).

When determining that the input has not been completed, the controller 31 repeats the process of step S405.

When determining that the input has been completed, the controller 31 sends the information indicating any selected commodity, which has been input in step S405, to the computer 21 (S406).

The computer 21 which has received the information indicating any selected commodity stores that information in the external storage device 32 (S307) and acquires the total of the selected commodities (S308).

Then, the computer determines a set of electronic notes from each electronic note obtained in step S305 (S309).

This set is determined in such a way that the sum of the amounts of electronic notes belonging to this set is greater than the total acquired in step S308 and the sum of the amounts of the electronic notes remaining after excluding any single electronic note from the set is smaller than the total computed in step S308.

Then, the computer 21 further selects another arbitrary one of all the electronic notes belonging to the selected set (S310), and acquires the total of the remaining electronic notes excluding the one selected in step S310 (S311).

Then, the computer 21 generates information representing what results from subtraction of the total acquired in step S311 from the amount computed in step S308 (S312).

Next, the computer 21 connects to the computer 11 of the electronic note generation site 1 over the network 4 (S313). Then, the computer 21 sends the computer 11 information on the difference obtained in step S312, the authentication code 73 representing the electronic note further selected in step S310, information about the amount of that electronic note and a signal requesting separation of said electronic note (S314).

Upon reception of those information and the separation requesting signal, the computer 11 commences the electronic note separation program 57 shown in FIG. 7.

After starting the electronic note separation program 57, the computer 11 searches the electronic note list 74 for the record that including the received authentication code 73, and deletes this record from the list 74 (S501).

Next, the computer 11 generates information which specifies a new electronic note whose amount is equal to the amount difference indicated by the information received from the computer 21 (S502). Then, the computer 11 combines this information and the information on the difference received from the computer 21 and encodes the resultant information, both by the same schemes as are used in step S112 by the electronic note generation program 52, thus generating an authentication code 73 (S503).

Then, the computer 11 generates a new record in the electronic note list 74 and stores information specifying the new electronic note and information on the difference, received from the computer 21, in that record (S504).

The computer 11 then acquires a difference between the amount of the electronic note deleted from the electronic note list 74 and the amount of the electronic note generated in step S503 (S505).

Then, generation of the authentication code 73 which represents the electronic note whose amount equals the difference and recording of information of that electronic note in the electronic note list 74 are carried out in the same procedures as done in steps S502–S505 (S506).

The computer sends the information on the amounts of two electronic notes and the two authentication codes 73, generated in steps S502 and S503 and step S506, to the computer 21 (S507), then terminates the electronic note separation program 57.

When receiving the authentication codes 73 representing the two electronic notes and the information on the amounts of those electronic notes (S315), the computer 21 terminates connection to the electronic note generation site 1 (S316). Then, the computer 21 sends the authentication code 73 representing an electronic note belonging to the currently selected set of electronic notes, and information about acceptance of a contract for supply of a commodity and representing erasure of this authentication code 73 to the controller 31 (S317).

The controller 31, which has received the request to erase the authentication code 73 and the authentication code 73 to be erased, deletes this authentication code 73 from the external storage device 32 (S407) and sends an acknowledgement of the completion of deletion to the computer 21 (S408).

Upon reception of the acknowledgement of deletion completed, the computer 21 sends the controller 31 the authentication code 73 for the electronic note whose amount differs from the differential amount, acquired in step S312, and information indicating the amount of the electronic note that is indicated by that authentication code 73 (S318). Note that when the amounts of two electronic notes received in step S315 are equal to each other, any single authentication code 73 should be sent.

The controller 31 which has received the authentication code 73 and the information on the amount stores the authentication code 73 in the external storage device 32 and displays that amount on the display device 34 (S409). Then, the controller 31 sends a signal requesting disconnection to the host computer (S410).

The computer 21 which has received the disconnection request sends controller 31 a signal acknowledging disconnection (S319), and returns to S301.

Upon reception of the disconnection acknowledgment (S411), the controller 31 terminates the transaction request program 55.

Through the above-described processing, the authentication code 73 is sent to the transaction site 2 from the electronic note user site 3, and when validation of the electronic note indicated by this authentication code 73 is confirmed, the electronic note user site 3 can make a contract for provision of any commodity, presented by the transaction site 2, within the range whose upper limit is the total amount of electronic notes.

When a commodity is selected at the electronic note user site 3, the transaction site 2 sends an acknowledge of acceptance of the selection to the electronic note user site 3. Then, the transaction site 2 confirms that that of the electronic note present at the electronic note user site 3 which has been presented to the transaction site 2 for the selected commodity has been deleted, and then sends an electronic note corresponding changes to the electronic note user site 3.

The transaction site 2 and the electronic note user site 3 can reuse the authentication code 73 they are holding, as a price for a transaction, and can also show the authentication code 73 to the manager or the like at the electronic note generation site 1 and ask for payment of money equivalent to the amount indicated by the presented information.

The electronic note generation site 1 and the transaction site 2 may share a computer and an external storage device, or the transaction site 2 and the electronic note user site 3 may likewise share a computer and an external storage device.

The electronic note generation program 52 and the transaction program 53 need not be separate programs, so that a transaction for provision of a commodity may directly follow the generation of an electronic note.

If supply of a commodity can be performed directly at the transaction site 2, the transaction program 53 may not only accept supply of the commodity but also may include a process of supplying the commodity.

When a commodity to be supplied is shareware, for example, the computer 21 may download the shareware to the electronic note user site 3 in the aforementioned step S318 in accordance with the process of the transaction program 53.

Figure 8:
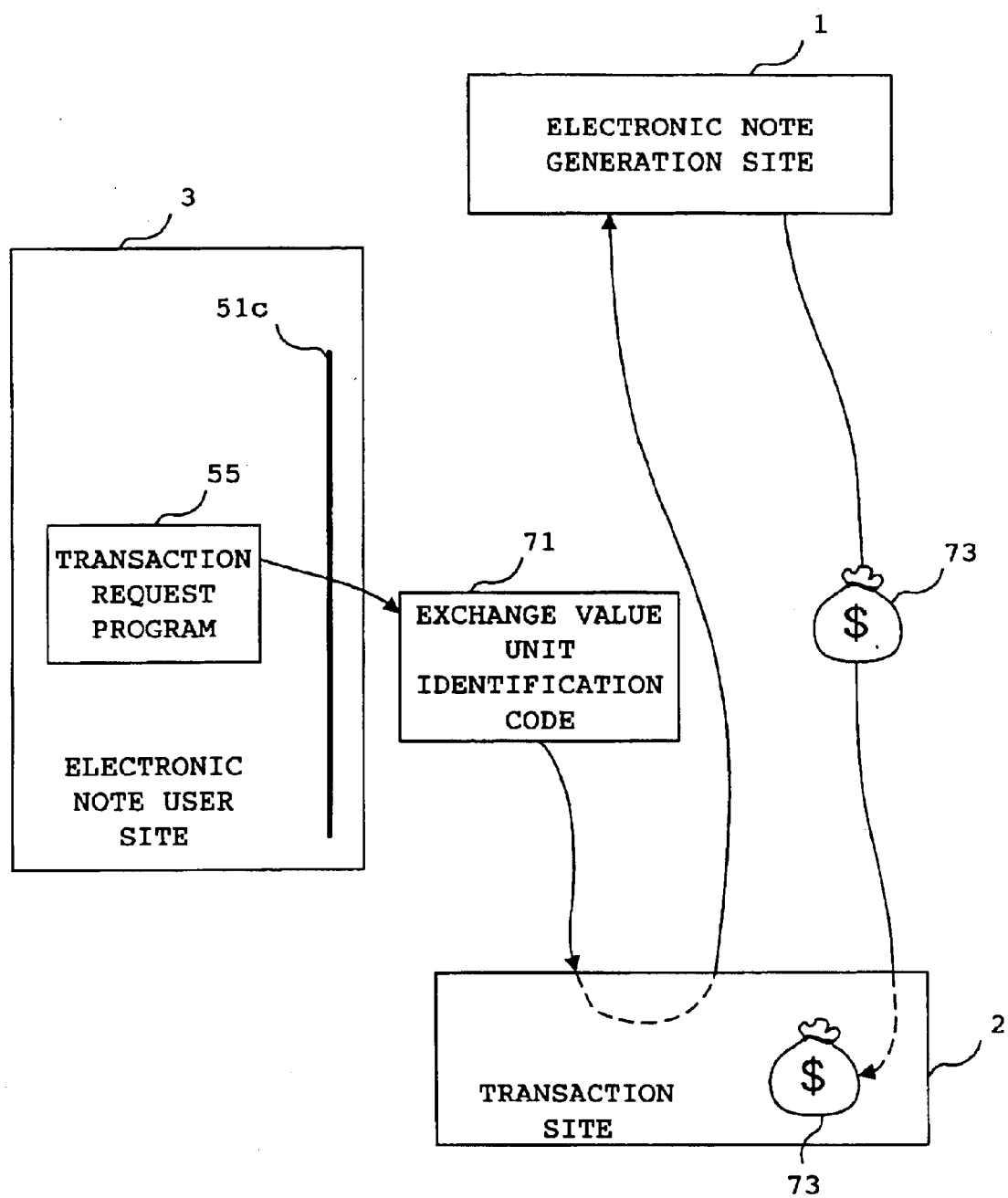
FIG. 8 is a diagram depicting a modification of the electronic commerce system shown in FIG. 1.

Further, as shown in FIG. 8, the transaction site 2 may acquire the exchange value unit identification code 71 from the electronic note user site 3 at the time of making a transaction and may request the electronic note generation site 1 to generate an electronic note whose amount is equivalent to the value of the commodity to be provided, and the electronic note generation site 1 may generate the electronic note of the amount and send the authentication code 73 for that electronic note to the transaction site 2.

Figure 9:
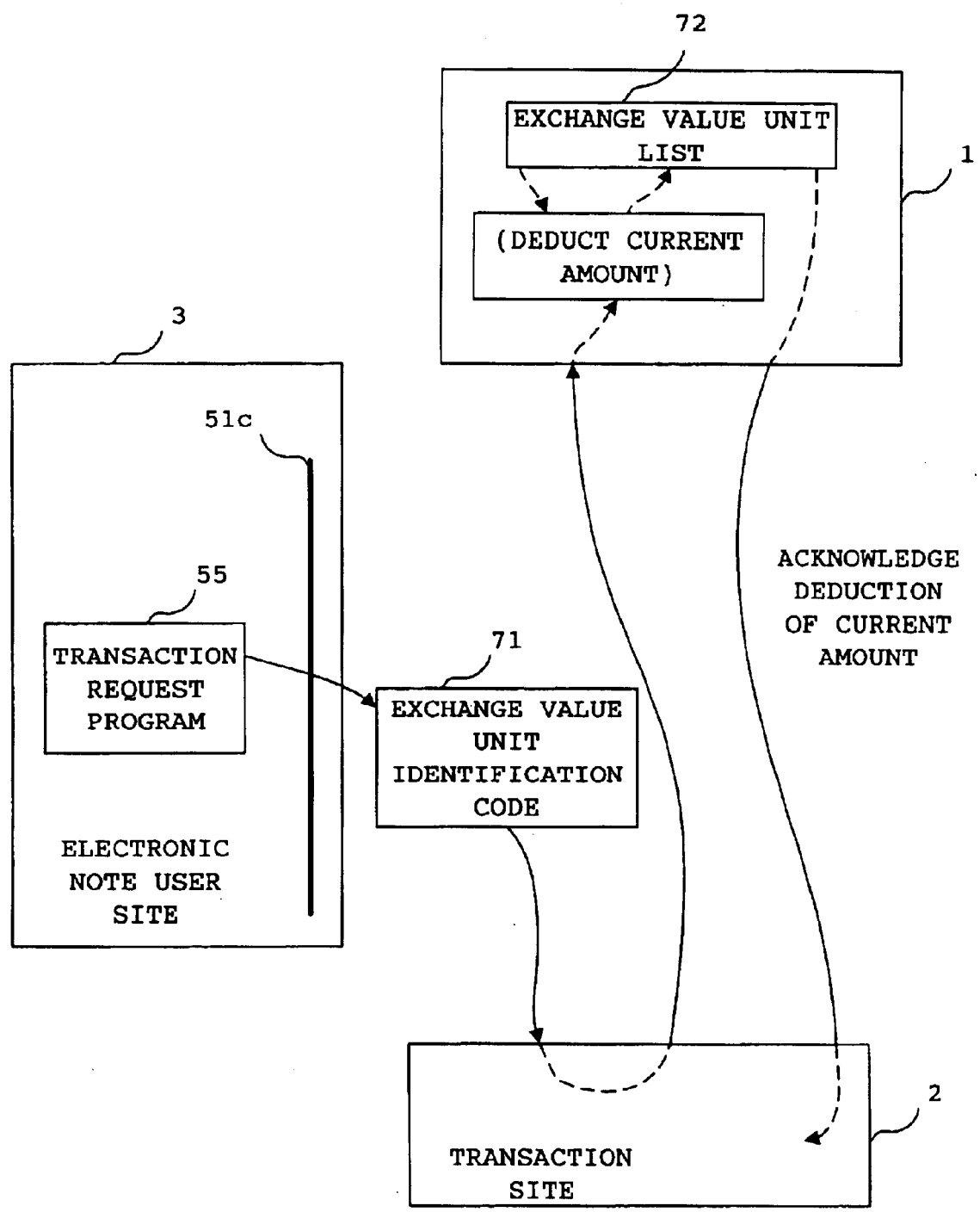
FIG. 9 is a diagram showing another modification of the electronic commerce system shown in FIG. 1.
Figure 9:

In the case where the transaction site 2 acquires the exchange value unit identification code 71 and makes a transaction, as shown in FIG. 9, the electronic note generation site 1 need not generate an electronic note, may deduct an amount equivalent to the price for a commodity from the current amount of the exchange value unit when informed of the deduction and may report the transaction site 2 to the effect that the deduction has been executed.

Specifically, for example, if information for selecting a commodity to be purchased is sent to the transaction site 2 which is open as a home page in the Internet, and the exchange value unit identification code 71 described on scratch paper is sent to the transaction site 2, the amount of the exchange value unit may be reduced by the price for the commodity.

In this case, the transaction site 2 may simply inform the electronic note generation site 1 of the reduction of the amount of the exchange value unit, or the transaction site 2 may refer to the electronic note generation site 1 for the balance of the exchange value unit and the electronic note generation site 1 may decide the reduction of the balance and inform the transaction site 2 of that event.

Further, the processes which are performed by the electronic note generation program 52, the transaction program 53, the electronic note request program 54, the transaction request program 55 and the electronic note separation program 57 are not limited to those shown in FIGS. 3 to 7.

For instance, the information which is sent to the controller 31 from the computer 11 in accordance with the process of the electronic note generation program 52 and the information which is sent to the controller 31 from the computer 21 in accordance with the process of the transaction program 53 may both include documents described according to the HTML (HyperText Makeup Language).

When the information to be sent to the electronic note user site 3 includes such a document, the electronic note request program 54 and the transaction request program 55 may be software (browser) for browsing documents.

Figure 10:
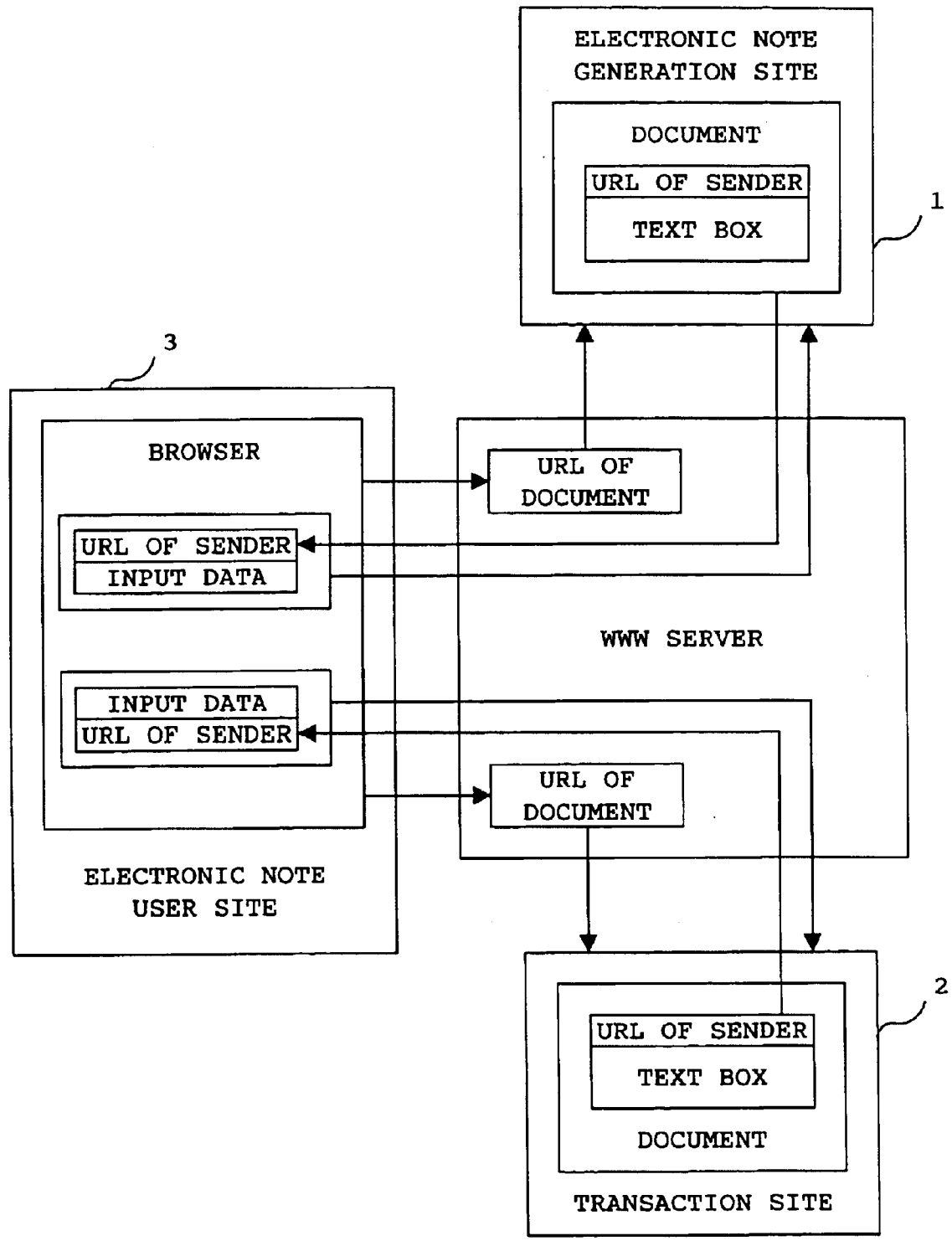
FIG. 10 is a diagram showing yet another modification of the electronic commerce system shown in FIG. 1.

In this case, the electronic note generation site 1, the transaction site 2 and the electronic note user site 3 are connected over the network to a WWW (World Wide Web) server as shown in, for example, FIG. 10 to execute the operations which will be explained below.

First, the electronic note user site 3 requests the electronic note generation site 1 or the transaction site 2 to transmit a document representing the form for inputting information the user will supply to the electronic note generation site 1 and the transaction site 2, via the WWW server in accordance with, for example, an instruction from the user who manipulates the electronic note user site 3.

Specifically, for example, the electronic note user site 3 supplies a URL identifying the form document to the WWW server to request transmission of the document.

The form document includes data about a text box for the user to write a string of characters and the URL (link information) indicating the destination of data written by the user in the text box.

The text box included in a document to be supplied from the electronic note generation site 1 includes a text box to write the exchange value unit identification code 71 and a text box to write the exchange-value requested amount. The text box included in a document to be supplied from the transaction site 2 includes a text box to write the authentication code 73 and a text box to write information for selecting a commodity. The destination indicated by link information coincides with the sender of the document itself which includes that link information.

Upon reception of the URL of the document whose transmission is requested, the WWW server accesses the electronic note generation site 1 and the transaction site 2 which retain that document, acquires the requested document and returns it to the electronic note user site 3.

When acquiring the document via the WWW server, the controller 31 of the electronic note user site 3 displays the image represented by the obtained document on the display device 34 in accordance with the browser's process to accept movement of the cursor and mouse pointer, inputting of a string of characters at the cursor position and inputting of a signal made by clicking of the mouse button.

When a string of characters is input at the cursor position, the controller 31 displays the input character string at the cursor position on the display screen of the display device 34. When the area on the display screen where link information is clicked, the controller 31 sends the WWW server that link information (i.e., the URL of the electronic note generation site 1 or the transaction site 2 which is the sender of the currently displayed document) and a string of characters which have been input up to the clicking time and is currently displayed on the display device 34.

Upon reception of the link information and the character string, the WWW server sends the received character string to the electronic note generation site 1 or the transaction site 2 that is indicated by the link information.

The electronic note generation site 1 receives the character string supplied from the electronic note user site 3 via the WWW server and analyzes its contents to acquire the exchange value unit identification code, the exchange-value requested amount and other information supplied from the electronic note user site 3. The transaction site 2 receives the character string supplied from the electronic note user site 3 via the WWW server and analyzes its contents to acquire the authentication code, information indicating the selected commodity and other information supplied from the electronic note user site 3. Then, the computer 11 of the electronic note generation site 1 accepts a request to generate an electronic note, determines whether or not to generate the authentication code 73, and carries out the generation and supply of the authentication code 73 to the electronic note user site 3, or accepts an application for provision of a commodity, determines whether or not to provide the commodity, reports the determination result, separates an electronic note and sends separated electronic notes to the transaction site 2.

The electronic note generation site 1 and the transaction site 2 may supply documents directly to the electronic note user site 3 without intervening the WWW server, and the electronic note user site 3 may send a document transmission request directly to the electronic note generation site 1 and the transaction site 2 without intervening the WWW server.

The documents to be transmitted to the electronic note user site 3 from the electronic note generation site 1 and the transaction site 2 need not be described according to the HTML.

After receiving the documents supplied from the electronic note generation site 1 and the transaction site 2 and displaying them, the controller 31 of the electronic note user site 3 may accept, for example, displays the image represented by the obtained document on the display device 34 in accordance with the browser's process to accept movement of the cursor and mouse pointer, and may send the input character string, information on the position of the cursor on the image at the time the character string has been input, information on the position of the mouse pointer on the image when the mouse is clicked, and information on the scroll status for the image currently displayed on the display device 34, to the sender of the information of the hypertext, currently displayed on the display device 34, as needed.

In this case, the electronic note generation site 1 and the transaction site 2 should analyze the information supplied from the electronic note user site 3, such as the character string and information which represents the cursor position, the position of the mouse pointer, and the image scroll status, to acquire the exchange value unit identification code, the exchange-value requested amount, the authentication code, information indicating the selected commodity and other information.

The quantities of the electronic note user site 3 and the transaction site 2 need not be one each, but can be set arbitrarily. When the network 4 is the Internet or an intranet and the computer connected to the network 4 has the function of a WWW server, for example, a plurality of home pages may be provided under the control of this computer and each transaction site 2 may be constituted by each home page. Further, this computer may serve as the electronic note generation site 1.

The electronic note user site 3 which receives the exchange value unit identification code 71 need not be the same as the electronic note user site 3 which receives the authentication code that has been generated by the electronic note generation program 52 as a result of the reception of the identification code 71, and there may be an electronic note user site 3 which does not run one of the electronic note request program 54 and the transaction request program 55. The electronic note user site 3 which does not run one of the transaction request program 55 may be an anonymous node or a terminal which is not associated with a specific user.

Each electronic note need not be generated as having an amount equal to an exchange-value requested amount, but may be generated in predetermined separated units of, for example, one cent, five cents, ten cents and so forth, the same way as ordinary money is separated.

Figure 11:
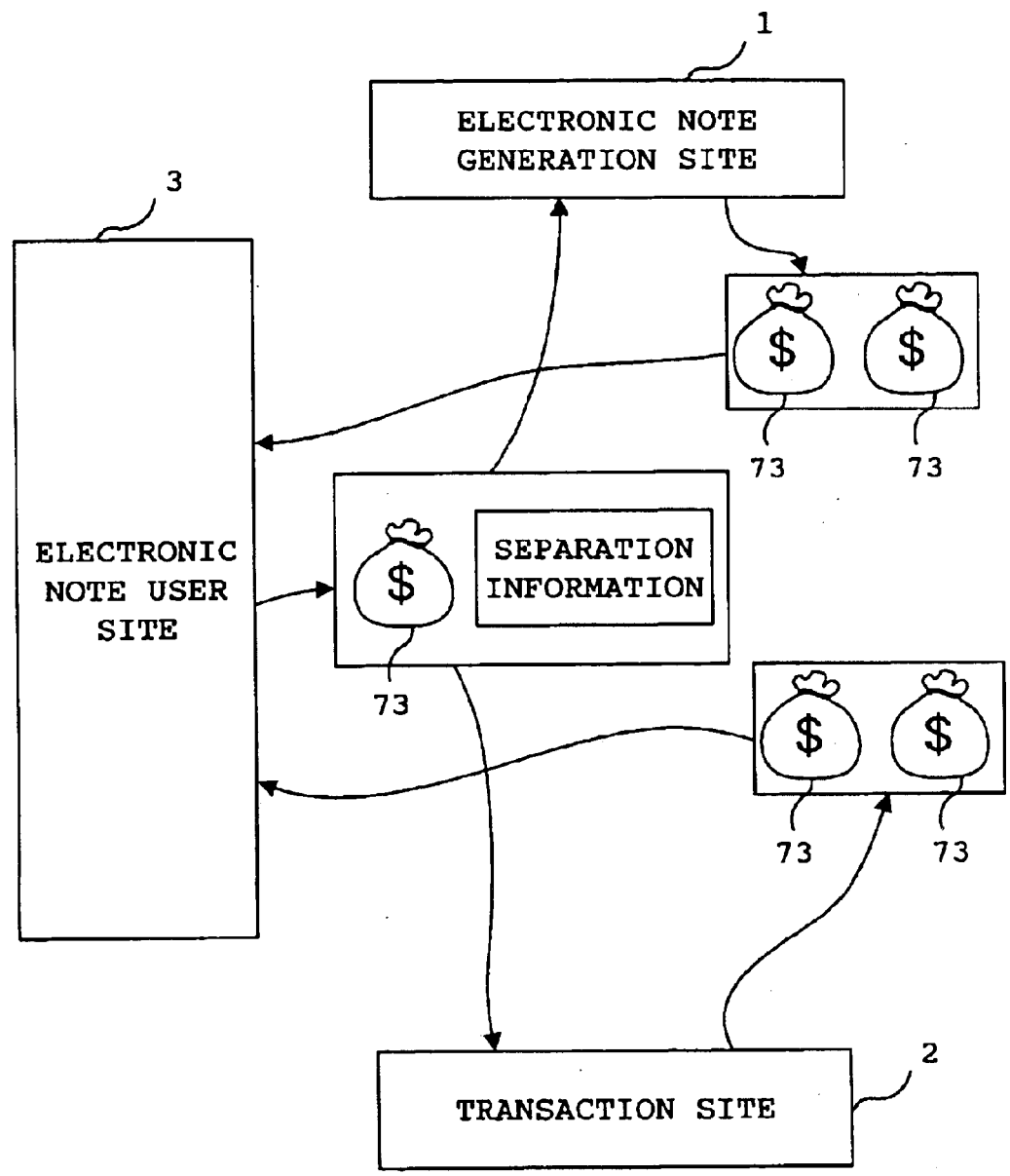
FIG. 11 is a diagram showing a further modification of the electronic commerce system shown in FIG. 1.
Figure 11:

The electronic note generation site 1 may separate an electronic note not only by a request from the transaction site 2 but also by a request from the electronic note user site 3 as shown in FIG. 11. The separation of an electronic note is not limited to the above-described manner, and an electronic note may be separated in predetermined units, for example, those of ordinary money.

A medium for circulating the exchange value unit need not be scratch paper, but may be a floppy disk, a CD-ROM or another non-volatile recording medium. The electronic note user site 3 may further be equipped with a floppy disk drive, a CD-ROM driver or the like to read the exchange value unit identification code 71.

The sites which generate an electronic note should not necessarily be just electronic note generation sites and plural types of sites may exist for the purpose, as long as an electronic note generated by those sites are not redundant.

Specifically, a plurality of electronic note generation sites 1 may be assigned with authentication codes 73 they can generate themselves, and each electronic note generation site 1 may generate an electronic note separately from the other electronic note generation sites 1.

As another example where a plurality of sites generate an electronic note, the transaction site 2 which is authorized by the manager or the like at the electronic note generation site 1 may separate an electronic note on its own, as shown in FIG. 11.

When the transaction site 2 separates an electronic note, the transaction site 2 may include information of the authentication code 73 of the electronic note to be separated (i.e., an electronic note which is to be deleted in exchange of generation of two electronic notes) into the separated electronic notes to avoid redundancy of electronic notes.

If the transaction site 2 records an electronic note it holds in its the external storage device 22, this electronic note may be sent as changes to the electronic note user site 3 in the process of utilizing electronic notes.

The transaction site 2 should not necessarily always give an electronic note at the electronic note user site 3 to the electronic note user site 3, but may save it in the external storage device 22 or the like after associating it with identification information of the authorized user of the electronic note, and withdraw it as a transaction oriented value in accordance with a request by the authorized user or return it to that user.

Figure 12:
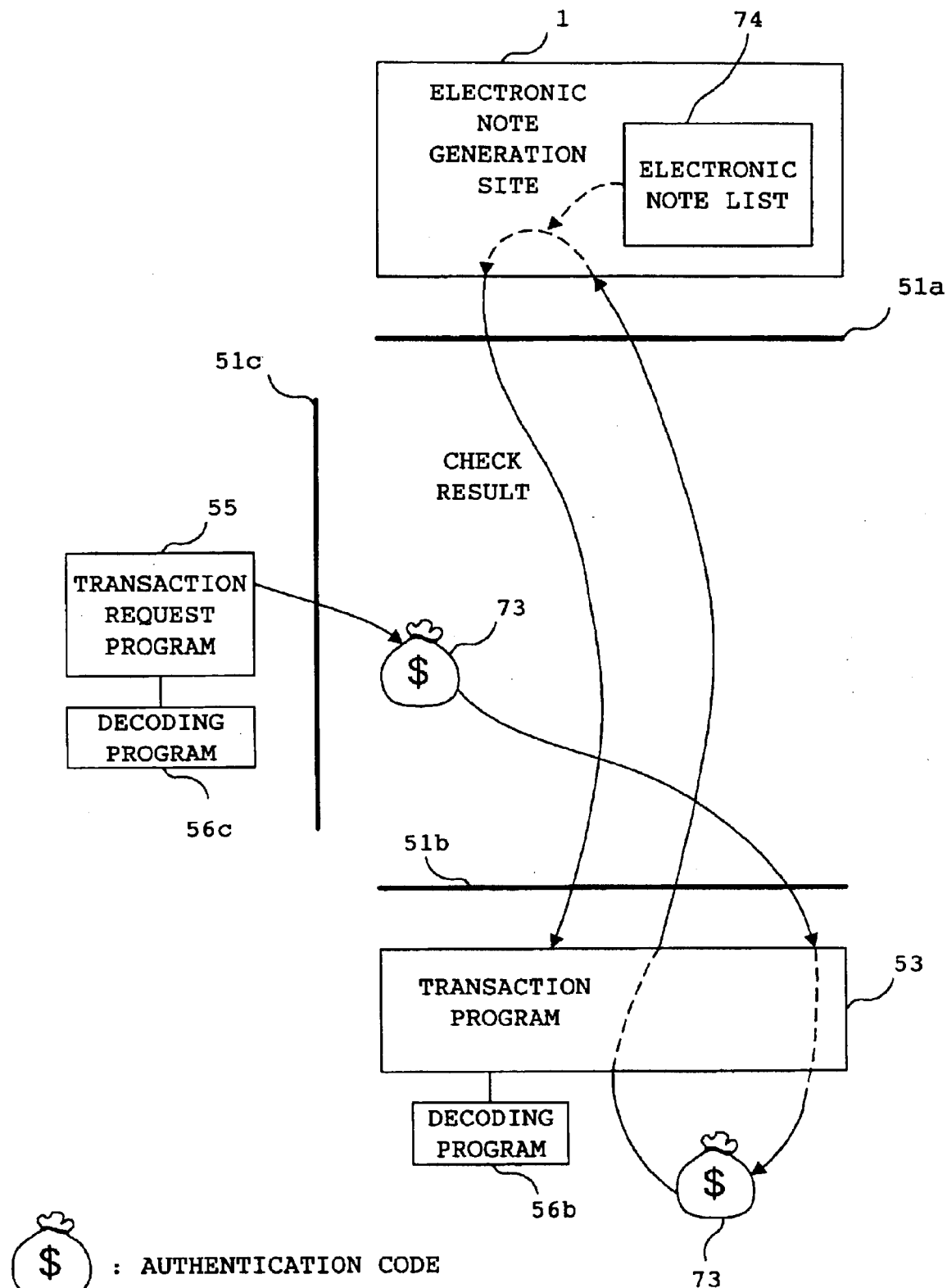
FIG. 12 is a diagram depicting yet a further modification of the electronic commerce system shown in FIG. 1.

As shown in FIG. 12, for example, the transaction program 53 may include a process of checking the received authentication code 73 against the individual records in the electronic note list 74 at the electronic note generation site 1 to check the received authentication code 73 is valid.

An electronic note may be read from the external storage device 32 of the electronic note user site 3 and recorded on a non-volatile recording medium to be carried around, so that it can be used in a transaction using another electronic note user site 3 or can be transferred without going through the network 4.

When an electronic note is carried out and transferred over no network 4 as mentioned above, copying of an electronic note can be prevented by, for example, handing the authentication code 73 as follows.

Figure 13:
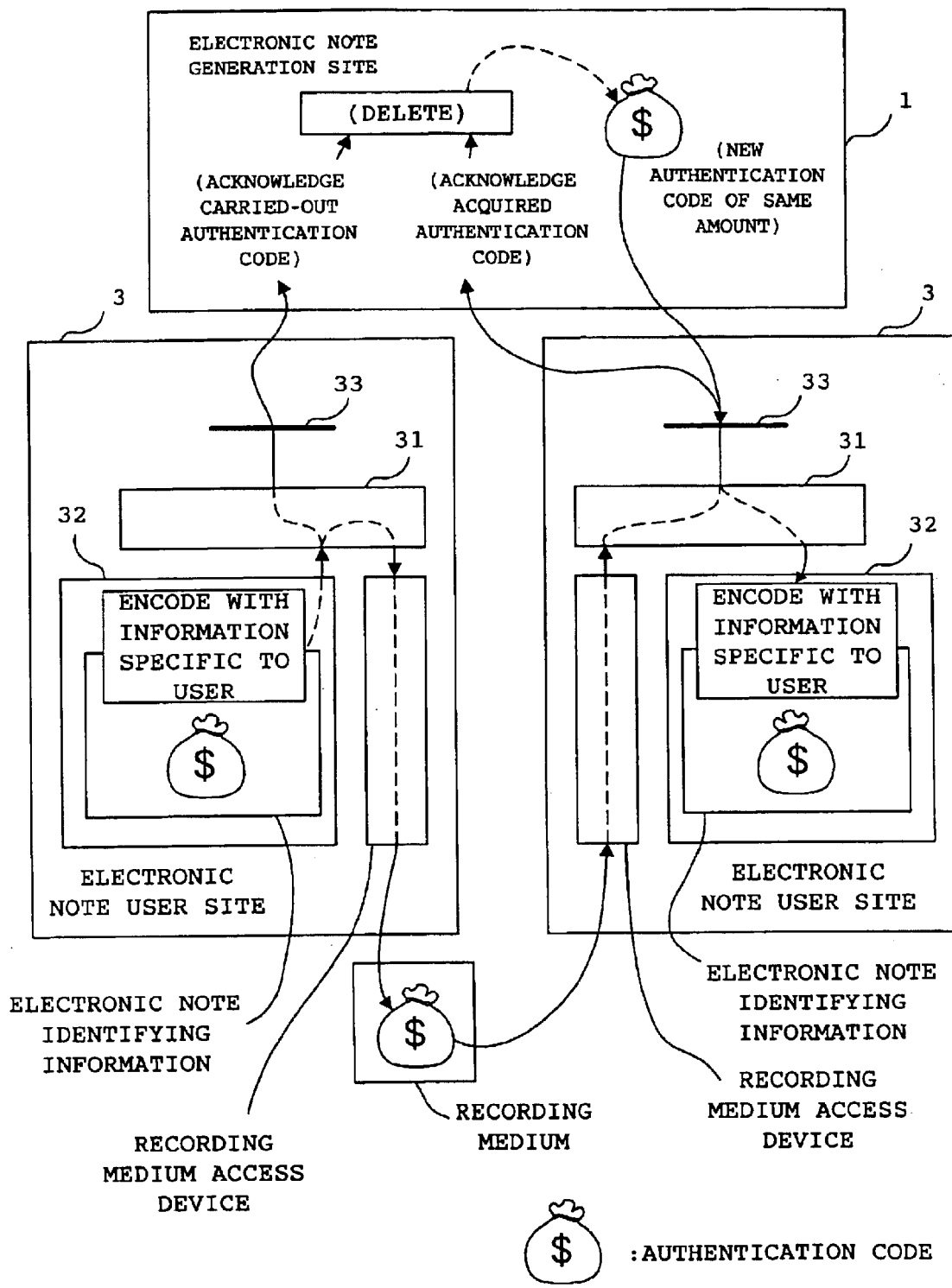
FIG. 13 is a diagram illustrating procedures of storing an authentication code on a recording medium and making a transfer according to the electronic commerce system embodying this invention.

In storing the authentication code 73 in the external storage device 32, as shown in FIG. 13, the electronic note user site 3 should encode the authentication code 73 with information specific to each authorized user (e.g., the name) as a key to yield electronic note identifying information different from the authentication code 73 and then should save the information.

At the time an electronic note is recorded on a non-volatile recording medium, the electronic note identifying information is decoded and is recorded as the original authentication code 73. Then, the electronic note user site 3 connects to the electronic note generation site 1 and reports the authentication code 73 of the electronic note that has been carried out from the external storage device 32 to the electronic note generation site 1. The electronic note generation site 1 stores the report.

The authentication code 73 recorded on the non-volatile recording medium is stored in the external storage device 32 of the electronic note user site 3 by some operation by a person who is the transferee of the non-volatile recording medium or a copy of that recording medium, and is encoded with information specific to that person as a key.

Thereafter, the electronic note user site 3 and the electronic note generation site 1 are connected together, and the authentication code 73 transferred from the non-volatile recording medium is reported to the electronic note generation site 1.

When the electronic note generation site 1 is holding a report about the electronic note having been carried out at the time it is informed by the electronic note generation site 1, the site 1 determines that the carry-out of the electronic note has been cleared.

Then, the electronic note generation site 1 erases the stored report about the carry-out of the electronic note and deletes the authentication code 73 of that electronic note from the electronic note list 74. Then, the electronic note generation site 1 generates a new electronic note equal in amount to the electronic note that is represented by the deleted authentication code 73.

The authentication code 73 need not be generated under the condition that a corresponding value should be paid. For example, the exchange value unit identification code 71 may be distributed free. The transaction site 2 and the electronic note user site 3 may present the electronic note generation site 1 with their holding authentication codes 73 or electronic note identifying information so as to be able to request an advance payment of money equivalent to the amount that is indicated by the presented information.

Figure 14:
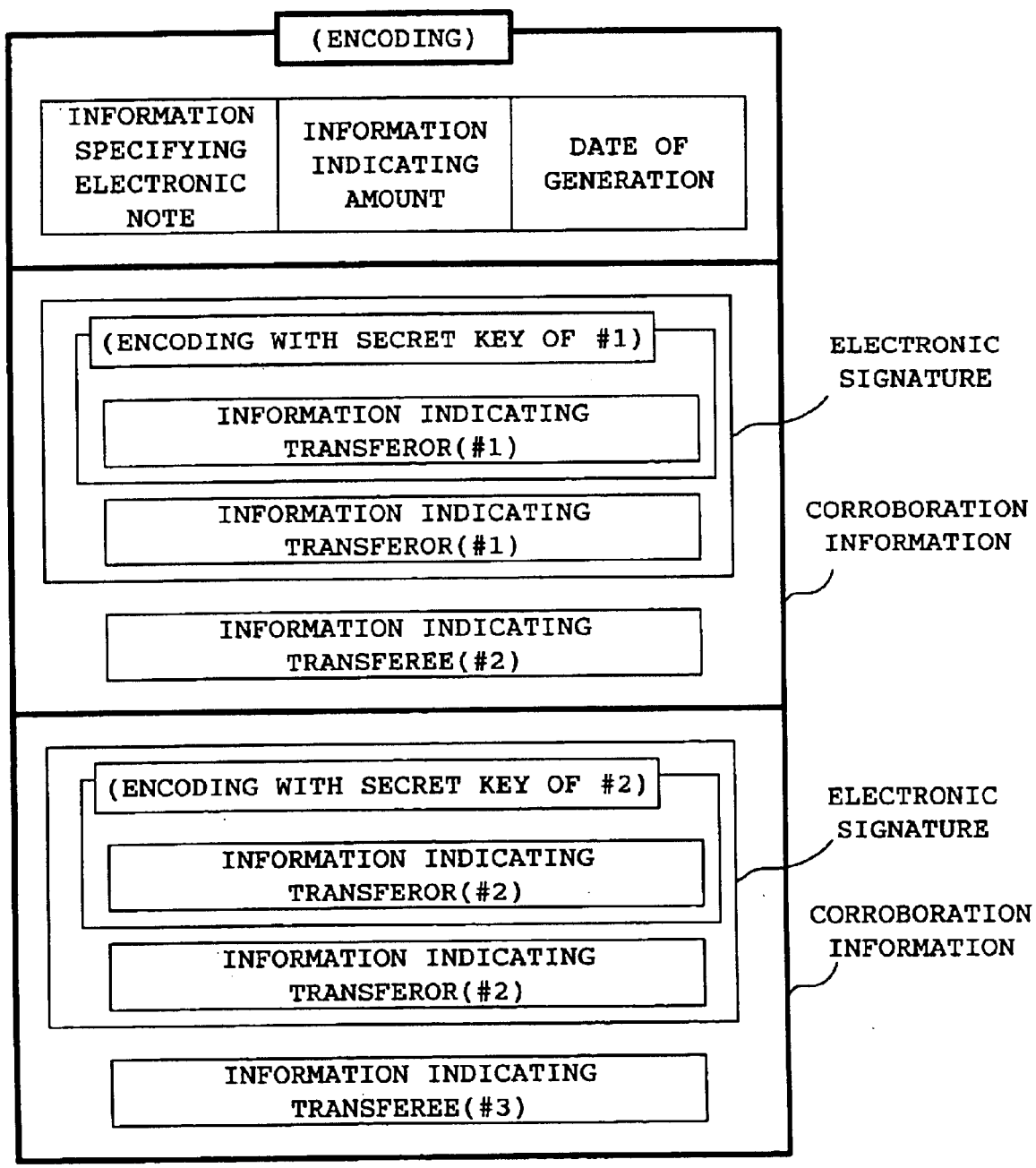
FIG. 14 is a diagram exemplary showing the data structure of an authentication code.

As shown in FIG. 14, for example, the authentication code 73 may include information representing the date the authentication code was issued, and every time the authentication code 73 is transferred, corroboration information consisting of information for identifying the transferor or the transferee of that authentication code 73 (e.g., the names of those participants or identification codes previously assigned to those persons) may be added. FIG. 14 shows the data structure of the authentication code 73 in the case where the authentication code 73 is transferred from the first transferor #1 to the first transferee #2, then from the second transferor or the first transferee #2 to the second transferee #3.

The corroboration information is added in accordance with an instruction from the person who transfers the authentication code 73. To indicate that the corroboration information has genuinely been added in response to an instruction from the transferor of the authentication code 73, information among those included in the corroboration information, which is for identifying the transferor of the authentication code 73, should consist of the electronic signature of the transferor of the authentication code 73.

The electronic signature consists of a code acquired by encoding an identification code, assigned to the transferor of the authentication code 73, with a secret key assigned to the transferor, and the non-encoded identification code. Whether or not the corroboration information has genuinely been added by the person who has assigned the identification code which has been encoded with the secret key is checked by decoding the encoded identification code using a public key which has previously been associated with the secret key, and checking if the resultant decoded identification code with the non-encoded identification code.

The corroboration information described above allows the electronic note generation site 1 to carry the monetary value of the authentication code 73 which has been issued without a corresponding value, thereby enhancing the creditability of the authentication code 73.

Suppose that when the manager or the like at the electronic note generation site 1 is presented with the authentication code 73 or electronic note identifying information and receives a claim of an advance payment, the manager refuses the advance payment because the first person who got the electronic note represented by the presented information has not paid the corresponding value equivalent to the amount of the electronic note to the manager of the electronic note generation site 1 or some other reason. In this case, if the corroboration information is included in the authentication code 73, the electronic note user site 3 which has presented the authentication code 73 can specify the old transferee of the authentication code 73 and can ask the specified person for the payment of the amount represented by the authentication code 73.

The authentication code 73, which is not limited to the aforementioned type, may include other arbitrary information than the information that specifies an electronic note. The individual pieces of information included in the authentication code 73, excluding the amount of an electronic note and the electronic note specifying information, may vary due to the transfer of the authentication code 73, the elapsed time and some other factors.

For example, the authentication code 73 may include information on the number of times the authentication code 73 has been transferred since generation, or information indicating the issued time of the authentication code 73 or the time of its transfer.

As another example, when each electronic note is transferred to the transaction site 2, the transaction site 2 may request an input of personal information such as the age and a commodity to be purchased, and when the input is made at the electronic note user site 3, the personal information may be included in the authentication code 73 for later use in a statistical research or the like.

Further, individual authentication codes 73 may be handled differently according to the contents of the information included in each code.

When each authentication code 73 includes information about the number of transfers made since generation, for example, the transaction site 2 may reject a transfer of any authentication code 73 whose number of transfers exceeds ten.

Furthermore, when each authentication code 73 includes information of the time of generation, the transaction site 2 may reject a transfer of any authentication code 73 which has passed a predetermined time since generation.

Figure 15:
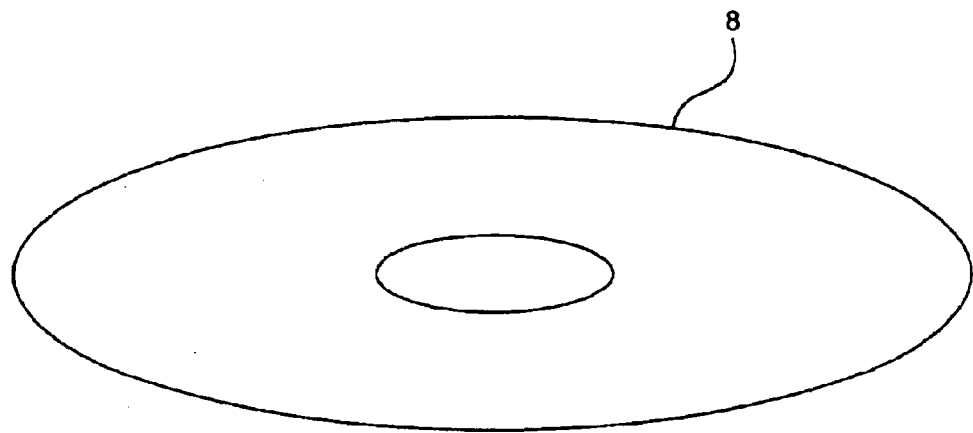
FIG. 15 is a diagram of a CD-ROM for storing a program which allows a computer to serve as the electronic commerce system embodying this invention.

Although one embodiment and several modifications of this invention have been described hereinabove, the electronic commerce system of this invention can be implemented by using an ordinary computer system, not a special-purpose system. For example, the electronic commerce system which carries out the above-described processes can be implemented by installing programs, stored on a medium (e.g., a floppy disk, CD-ROM 8 shown in FIG. 15, or the like), for executing the above-described operations onto a personal computer.

A medium for providing a computer with programs may be a communication medium (any medium which retains programs in temporary and mobile form, such as a communications line, a communications network or a communications system). For example, the programs may be put on the bulletin board system (BBS) of a communications network and then distributed over the network.

The above-described processes can be performed by invoking those programs under the control of the operating system (OS) in the same way as other application programs.

In summary, this invention realizes an electronic commerce system in which electronic representations to be circulated represent property values themselves and which keeps the anonymity of the generator of an electronic representation and old participants who dealt with the electronic note at the time of generating and transferring the electronic representation.

What is claimed is:

1. An electronic monetary system including a network, electronic note generation means connected to said network, contract means connected to said network, and one or more electronic note using means, at least one of said electronic note using means including electronic note request means for receiving authorization information representing a generation request for an electronic note or an electronic representation of money and presenting said authorization information to said electronic note generation means via said network to request generation of an electronic note of a predetermined amount, said electronic note generation means including means for accepting presentation of said authorization information and a request for generation of said electronic note from said electronic note using means, determining if said authorization information represents a generation request for said electronic note of said predetermined amount, and, when determining that such representation is true, generating and supplying said electronic note of said predetermined amount to said electronic note using means, at least one of said electronic note using means including contract applying means for receiving and saving said electronic note of said predetermined amount, presenting said electronic note to said contract means to apply for closing of a contract for supply of a commodity, said contract means including:

contract accepting means for detecting presentation of said electronic note and an application for closing of said contract from said electronic note using means and receiving an electronic note which belongs to said presented electronic note and has an amount equivalent to a price of said commodity;

means for calculating an excess amount which is a total amount of said electronic note received from said electronic note using means that exceeds said price of said commodity, and means for supplying information indicative of said excess amount and said electronic note of an amount exceeding said excess amount to said electronic note generation means, said electronic note generation means including means for invalidating said electronic note of an amount exceeding said excess amount, generating a first electronic note of an amount substantially equal to said excess amount and a second electronic note of an amount substantially equal to a difference between said amount of said invalidated electronic note and said excess amount, and supplying said first electronic note and said second electronic note to said contract means, and said contract means further including means for receiving said first and second electronic notes and supplying said second electronic note to said electronic note using means.

2. The electronic monetary system according to claim 1, wherein said contract means includes:

means for calculating an excess amount which is a total amount of said electronic note received from said electronic note using means that exceeds said price of said commodity; and means for determining if said contract means has itself already retained said electronic note whose total amount is equivalent to said excess amount, and, when determining that such an electronic note is held, supplying said second electronic note whose total is equivalent to said excess amount to said electronic note using means.

3. The electronic monetary system according to claim 1, wherein said electronic note generation means determines if said authorization information received from said electronic note using means represents a generation request for said electronic note whose amount exceeds said predetermined amount, and, after determining that said amount of said electronic note is greater than said predetermined amount, handles said authorization information as representing a generation request for an electronic note of an amount which is said predetermined amount subtracted from an amount represented before determination.

4. The electronic monetary system according to claim 1, wherein said contract means includes means for supplying said commodity to said electronic note using means.

5. The electronic monetary system according to claim 1, wherein at least one of said electronic note using means, said contract means and said electronic note generation means has means for appending additional information to said electronic note; and at least one of said electronic note using means, said contract means and said electronic note generation means has means for acquiring said additional information appended to said electronic note.

6. The electronic monetary system according to claim 5, wherein said contract means includes means for acquiring said additional information appended to said electronic note and determining whether or not to receive said electronic note based on said additional information.

7. The electronic monetary system according to claim 1, wherein said electronic note generation means includes means for appending date information indicating a date on which said electronic note has been generated, to said electronic note;

said electronic note using means includes means for appending date information indicating a date on which said electronic note has been transferred, to said electronic note; and said contract means includes means for determining whether or not to receive said electronic note based on said date information appended to said electronic note.

8. The electronic monetary system according to claim 1, wherein said electronic note using means includes means for appending corroboration information indicating said electronic note having been transferred, to said electronic note; and said contract means includes means for determining whether or not to receive said electronic note based on said corroboration information appended to said electronic note.

9. The electronic monetary system according to claim 8, wherein said corroboration information includes transferor information for specifying a transferor of said electronic note and transferee information for specifying a transferee of said electronic note, said transferor information including signature information corroborating that said transferor information has been prepared by said transferor.

10. The electronic monetary system according to claim 1, wherein at least one of said electronic note using means has transfer means for transferring said electronic note it stores itself to a recording medium readable by a computer; and at least one of said electronic note using means has transferee means for acquiring said electronic note transferred to said recording medium.

11. The electronic monetary system according to claim 10, wherein each of said electronic note using means has means for encrypting said electronic note with an encryption key specific to each electronic note using means;

said electronic note using means having said transfer means has means for supplying first transfer data indicative of said electronic note to be transferred to said recording medium, to said electronic note generation means;

said electronic note using means having said transferee means has means for supplying second transfer data indicative of said electronic note acquired from said recording medium, to said electronic note generation means; and said electronic note generation means has means for determining if said first and second transfer data represent substantially the same electronic note, and, when determining that such representation is true, generating and supplying an electronic note of an amount substantially equal to the amount of said electronic note indicated by said second transfer data, to said electronic note using means to which said second transfer data has been supplied.

12. The electronic monetary system according to claim 1, wherein said electronic note generation means includes means for transferring said generation request form data representing a form to fill in predetermined items including said authorization information and said predetermined amount, to said electronic note using means; and said electronic note request means includes:

means for displaying said form represented by said generation request form data on a display screen;

means for acquiring said authorization information and filling said predetermined items in said form displayed on said display screen; and means for transmitting said predetermined items filled in said form to said electronic note generation means to thereby request generation of said electronic note.

13. The electronic monetary system according to claim 12, further comprising a server connected to said electronic note request means; and wherein a specific resource locator is affixed to said generation request form data;

said electronic note request means has means for transmitting said resource locator to said server; and said server has means for acquiring said generation request form data affixed with said resource locator, received from said electronic note request means, from said electronic note generation means and transmitting said generation request form data to said electronic note request means.

14. The electronic monetary system according to claim 13, wherein said server has said electronic note generation means.

15. The electronic monetary system according to claim 1, wherein said contract means includes means for transferring application form data representing an application form to fill in application items including said electronic note, to said electronic note using means; and said contract applying means includes:

means for displaying said application form represented by said application form data on a display screen;

means for acquiring said electronic note and filling said application items in said application form displayed on said display screen; and means for transmitting said application items filled in said application form, to said electronic note generation means to thereby apply closing of a contract for supply of a commodity.

16. The electronic monetary system according to claim 15, further comprising a server connected to said contract applying means; and wherein a specific resource locator is affixed to said application form data;

said contract applying means has means for transmitting said resource locator to said server; and said server has means for acquiring said application form data affixed with said resource locator, received from said contract applying means, from said contract means and transmitting said application form data to said contract applying means.

17. The electronic monetary system according to claim 16, wherein said server has said contract means.

18. The electronic monetary system according to claim 1, wherein said contract means includes means for informing said electronic note generation means of information indicating said electronic note presented by said electronic note using means; and said electronic note generation means includes:

means for storing a list of information showing said generated electronic note; and means for determining if said list contains said information indicating of said electronic note informed by said contract means and informing said contract means of a determination result.

19. An electronic monetary system comprising an electronic note generation section, a plurality of electronic notes exchange sections and a network, the former two connected to one another via said network, each of said electronic note exchange sections sending an identification code requesting generation of an electronic note comprised of information representing a predetermined amount, to said electronic note generation section to request said electronic note generation section to generate said electronic note representing said amount, said electronic note generation section determining whether or not to generate said electronic note representing said amount based on said identification code received, and generating and supplying said electronic note representing said amount to said electronic note storage section that has sent said identification code, when determining to generate said electronic note, each of said electronic note exchange sections further receiving and saving said electronic note representing said amount from said electronic note generation section, sending information on said saved electronic note to the other electronic note exchange sections, receiving information indicative of said electronic note from the other electronic note exchange sections, determining whether or not to accept said electronic note based on said received information indicative of said electronic note, and, when determining to receive said electronic note, receiving said electronic note, at least one of said electronic note exchange sections further supplying information indicative of predetermined amount and said electronic note of an amount exceeding said predetermined amount to said electronic note generation section, said electronic note generation section further invalidating said electronic note of an amount exceeding said predetermined amount, generating a first electronic note of an amount equal to said predetermined amount and a second electronic note of an amount equal to a difference between said amount of said invalidated electronic note and said predetermined amount, and supplying said first and second electronic note to said electronic note exchange section which supplied said information indicative of said predetermined amount, and said electronic note exchange section which supplied said information indicative of said predetermined amount further receiving said first and second electronic notes and supplying said second electronic note to another one of said electronic note exchange sections.

20. An electronic monetary system comprising an electronic note generation server connected to an outside network, a contract server connected to said network, and one or more electronic note using terminals connected to said network, wherein:

at least one of said electronic note using terminals receives authorization information representing a generation request for an electronic note or electronic representation of money and presents said authorization information to said electronic note generation server via said network to request generation of said electronic note of a predetermined amount;

said electronic note generation server accepts presentation of said authorization information and a request for generation of said electronic note from said electronic note using terminal, determines whether or not said authorization information represents a generation request for said electronic note of said predetermined amount and generates and supplies said electronic note of said predetermined amount to said electronic note using terminal when determining that such representation is true;

at least one of said electronic note using terminals presents said electronic note to said contract server;

said contract server detects presentation of said electronic note from said electronic note using terminal, receives said electronic note having an amount equivalent to a predetermined price out of said presented electronic note, counts an excess amount which is caused by the total amount of said electronic note received from said electronic note using terminal exceeding said predetermined price, and supplies information indicative of said excess amount and said electronic note having an amount exceeding said excess amount to said electronic note generation server;

said electronic note generation server invalidates said electronic note of an amount exceeding said excess amount and generates and supplies a first electronic note of an amount substantially equal to said excess amount and a second electronic note of an amount substantially equal to a difference between an amount of said invalidated electronic note and said excess amount to said contract server; and said contract server receives said first and second electronic notes and supplies said second electronic note to said electronic note using terminal.

* * * * *